US009594188B2

(12) United States Patent
Chauhan et al.

(10) Patent No.: US 9,594,188 B2
(45) Date of Patent: Mar. 14, 2017

(54) UV BLOCKER LOADED CONTACT LENSES

(71) Applicant: UNIVERSITY OF FLORIDA RESEARCH FOUNDATION, INC., Gainesville, FL (US)

(72) Inventors: Anuj Chauhan, Gainesville, FL (US); Hyun-Jung Jung, Seoul (KR); Samuel B. Gause, Gainesville, FL (US)

(73) Assignee: UNIVERSITY OF FLORIDA RESEARCH FOUNDATION, INC., Gainesville, FL (US)

( * ) Notice: Subject to any disclaimer, the term of this patent is extended or adjusted under 35 U.S.C. 154(b) by 204 days.

(21) Appl. No.: 14/296,899

(22) Filed: Jun. 5, 2014

(65) Prior Publication Data

US 2014/0288206 A1 Sep. 25, 2014

Related U.S. Application Data

(63) Continuation-in-part of application No. PCT/US2012/068084, filed on Dec. 6, 2012.

(60) Provisional application No. 61/567,517, filed on Dec. 6, 2011, provisional application No. 61/860,568, filed on Jul. 31, 2013.

(51) Int. Cl.
*G02B 1/04* (2006.01)
*B29D 11/00* (2006.01)
*B82Y 30/00* (2011.01)
*B82Y 20/00* (2011.01)

(52) U.S. Cl.
CPC ........ *G02B 1/043* (2013.01); *B29D 11/00038* (2013.01); *B29D 11/00346* (2013.01); *B29D 11/00634* (2013.01); *B82Y 20/00* (2013.01); *B82Y 30/00* (2013.01); *Y10S 977/834* (2013.01); *Y10T 428/2982* (2015.01)

(58) Field of Classification Search
CPC .................................................. G02B 1/043
See application file for complete search history.

(56) References Cited

U.S. PATENT DOCUMENTS

| | | |
|---|---|---|
| 4,136,250 A | 1/1979 | Mueller et al. |
| 4,153,641 A | 5/1979 | Deichert et al. |
| 4,182,822 A | 1/1980 | Chang |
| 4,189,546 A | 2/1980 | Deichert et al. |
| 4,254,248 A | 3/1981 | Friends et al. |
| 4,259,467 A | 3/1981 | Keough et al. |
| 4,260,725 A | 4/1981 | Keough et al. |
| 4,261,875 A | 4/1981 | LeBoeuf |
| 4,276,402 A | 6/1981 | Chromecek et al. |
| 4,327,203 A | 4/1982 | Deichert et al. |
| 4,341,889 A | 7/1982 | Deichert et al. |
| 4,343,927 A | 8/1982 | Chang |
| 4,355,147 A | 10/1982 | Deichert et al. |
| 4,486,577 A | 12/1984 | Mueller et al. |
| 4,543,398 A | 9/1985 | Bany et al. |
| 4,605,712 A | 8/1986 | Mueller et al. |
| 4,661,575 A | 4/1987 | Tom |
| 4,703,097 A | 10/1987 | Wingler et al. |
| 4,716,234 A | 12/1987 | Dunks et al. |
| 4,719,248 A | 1/1988 | Bambury et al. |
| 4,740,533 A | 4/1988 | Su et al. |
| 4,837,289 A | 6/1989 | Mueller et al. |
| 4,871,785 A | 10/1989 | Froix |
| 4,910,277 A | 3/1990 | Bambury et al. |
| 4,954,586 A | 9/1990 | Toyoshima et al. |
| 4,954,587 A | 9/1990 | Mueller |
| 4,963,160 A | 10/1990 | Hung et al. |
| RE33,477 E | 12/1990 | Loshaek |
| 5,010,141 A | 4/1991 | Mueller |
| 5,034,461 A | 7/1991 | Lai et al. |
| 5,057,578 A | 10/1991 | Spinelli |
| 5,070,215 A | 12/1991 | Bambury et al. |
| 5,260,000 A | 11/1993 | Nandu et al. |
| 5,310,779 A | 5/1994 | Lai |
| 5,314,960 A | 5/1994 | Spinelli et al. |
| 5,336,797 A | 8/1994 | McGee et al. |
| 5,346,946 A | 9/1994 | Yokoyama et al. |
| 5,352,714 A | 10/1994 | Lai et al. |
| 5,358,995 A | 10/1994 | Lai et al. |
| 5,371,147 A | 12/1994 | Spinelli et al. |
| 5,387,632 A | 2/1995 | Lai et al. |
| 5,451,617 A | 9/1995 | Lai et al. |
| 5,470,932 A | 11/1995 | Jinkerson |
| 5,486,579 A | 1/1996 | Lai et al. |
| 5,543,504 A | 8/1996 | Jinkerson |
| 5,637,726 A | 6/1997 | Collins et al. |
| 5,945,465 A | 8/1999 | Ozark et al. |
| 5,962,548 A | 10/1999 | Vanderlaan et al. |

(Continued)

FOREIGN PATENT DOCUMENTS

WO    WO 2008-151019    12/2008

OTHER PUBLICATIONS

Lai, Y-C., "The Role of Bulky Polysiloxanylalkyl Methacrylates in Polyurethane-Polysiloxane Hydrogels," *Journal of Applied Polymer Science*, 1996, pp. 1193-1199, vol. 60.

*Primary Examiner* — Michael Pepitone
(74) *Attorney, Agent, or Firm* — Saliwanchik, Lloyd & Eisenschenk

(57) ABSTRACT

UV absorbing appliances, such as contact lenses, are prepared by including at least one UV absorbing compound in the appliances. UV absorbing compounds can be water insoluble and/or reside in UV absorbing nanoparticles having a mean diameter less than 10 nm. The UV absorbing nanoparticles incorporate into an appliance by polymerizing a monomer mixture containing the UV absorbing nanoparticles to form an appliance comprising the UV absorbing nanoparticles. The UV absorbing compounds or the UV absorbing nanoparticles incorporate into an appliance by placing the appliance in a solution of the UV absorbing compound or a dispersion of the UV absorbing nanoparticles in a non-aqueous solvent that swells the appliance. The UV absorbing compound or the UV absorbing nanoparticles infuse into the swollen appliance and are retained within the appliance upon removal of the non-aqueous solvent.

31 Claims, 20 Drawing Sheets

(56) References Cited

U.S. PATENT DOCUMENTS

| | | |
|---|---|---|
| 5,981,615 A | 11/1999 | Meijs et al. |
| 5,981,675 A | 11/1999 | Valint, Jr. et al. |
| 6,039,913 A | 3/2000 | Hirt et al. |
| 6,914,086 B2 | 7/2005 | Hong |
| 7,364,291 B2 | 4/2008 | Haywood et al. |
| 7,803,359 B1 | 9/2010 | Jinkerson et al. |
| 2007/0003603 A1* | 1/2007 | Karandikar ............ A01N 59/16 424/443 |
| 2007/0037898 A1 | 2/2007 | Phelan et al. |
| 2008/0166409 A1* | 7/2008 | St. John ............... A61K 9/5138 424/486 |
| 2008/0181931 A1* | 7/2008 | Qiu ....................... A61L 12/088 424/429 |
| 2009/0220556 A1* | 9/2009 | Shenderova ............ C04B 26/02 424/401 |
| 2010/0016514 A1 | 1/2010 | Qiu |
| 2010/0330146 A1 | 12/2010 | Chauhan et al. |
| 2011/0063567 A1 | 3/2011 | Domschke et al. |

* cited by examiner

UV BLOCKER LOADED CONTACT LENSES

CROSS-REFERENCE TO RELATED APPLICATIONS

This application is a continuation-in-part of International Patent Application No. PCT/US2012/068084, filed Dec. 6, 2012, which claims the benefit of U.S. Provisional Patent Application Ser. No. 61/567,517, filed Dec. 6, 2011, and also claims the benefit of U.S. Provisional Patent Application Ser. No. 61/860,568, filed Jul. 31, 2013, the disclosures of which are hereby incorporated by reference in their entirety.

BACKGROUND OF THE INVENTION

Exposure to the ultraviolet radiation from the sun has the potential to cause significant damage to the body including skin irritation, burning, and skin cancer. It has become a very common practice to use UV blocking lotions and creams to minimize the damage from sun exposure. While the general population is well aware of the potential for damage to skin from UV radiation, there is less awareness of the possibility of damage to other organs, particularly eyes. There is a growing concern that continuous exposure of UV radiation to eyes could cause serious medical problems including cataract and retina damage. UV radiation can cause mild irritation and a foreign body sensation in the eyes. Regular UV exposure can cause blindness, cataracts, photokeratitis, erythema of the eyelid, solar retinopathy, retinal damage, and cancer of cornea or conjunctiva. Damage from the UV radiation is likely due to free radical formation that causes protein modification and lipid peroxidation. The intraocular lens of an adult eye filters a majority of the UV light, whereas the lens of an infant's eye transmits nearly all of the UV light. UV transmittance decreases with age, and by the age of 25 nearly all UV light is absorbed by the lens. Accumulated exposure to UV light by the age of 25 could cause significant retinal damage.

UV damage can be minimized by wearing eye glasses or contact lenses that are protective against peripheral radiation. The degree of blocking however depends on the type of lenses and the design of the sunglasses. Most styles of sunglasses do not offer complete protection from UV radiation, allowing UV light to reach the eyes around the frames of the eyeglasses. Wearing UV blocking contact lenses, which cover the entire cornea, can provide UV protection from all angles.

The U.S. Food and Drug administration (FDA) has established standards for UV blocking contact lenses based on American National Standards Institute (ANSI) standards, and classifies UV blocking contact lenses into two categories (Class 1 and Class 2) depending on the extent of the protection. Class 1 lenses must block more than 90% of UVA and 99% of UVB (280-315 nm) radiation. Class 2 lenses must block more than 70% of UVA and 95% of UVB radiation. Although UVA radiation corresponds to the wavelength range of 315-400 nm, only wavelengths from 315-380 nm are considered for classification of a contact lens. Only three commercial contact lenses (ACUVUE® Oasys™, ACUVUE® Advance® and ACUVUE® Advance for Astigmatism) are categorized as Class 1 blocking lenses.

UV blocking by contact lenses is achieved by adding a UV absorbing molecule to the lens composition. UV absorbers and the preparation of UV blocking contact lenses has primarily involved monomeric UV absorbers that contain an acrylic or styrenic group for copolymerization with the lens forming material, for example: Loshaek, U.S. Pat. No. Re. 33,477; Dunks et al., U.S. Pat. No. 4,716,234; Bambury et al., U.S. Pat. No. 4,719,248; Jinkerson, U.S. Pat. No. 5,470,932; Jinkerson, U.S. Pat. No. 5,543,504; Collins et al., U.S. Pat. No. 5,637,726; Haywood et al., U.S. Pat. No. 7,364,291; and Jinkerson et al., U.S. Pat. No. 7,803,359. Hong et al., U.S. Pat. No. 6,914,086 teaches a crosslinkable UV absorber with a plurality of polymerizable vinyl groups for incorporation by copolymerization with the lens forming material. Hung et al., U.S. Pat. No. 4,963,160 teaches the absorption of an acid salt comprising an absorber on a contact lens followed by neutralization and extraction until only surface bound UV absorbers remain on the lenses. Fabrication of UV absorber containing contact lenses, or the contact lenses themselves, often suffer from one or more undesired features such as: long reacting times; low conversions; uncertainty in the degree of reaction; leach of unreacted UV absorber; yellowness; inconsistent integrity of the formed lens; expensive reactants; and tedious reacting process.

The major challenges in preparing a contact lens loaded with a UV absorber remain preparing the lens with short curing times at reasonable light intensities to avoid any undesired side reactions, maintaining the clarity and uniformity of the lens and the Absorber over the entire area of the lens, and avoiding any leaching of UV absorber from the lens. As currently there are only a few commercially available contact lenses that are approved as Class 1 UV blockers, there remains a need to develop effective UV blocking contact lenses.

BRIEF SUMMARY OF THE INVENTION

An embodiment of the invention is directed to a UV absorbing compound and UV absorbing nanoparticle comprising a UV absorbing compound dispersed in a cross-linked gel. The gel has a high cross-link density such that the UV absorbing compound can not diffuse from the gel. The UV absorbing nanoparticles have a mean cross-section that is less than 10 nm. The UV absorbing compound, for example, 1,3-diphenyl-1,3-propanedione (DP), absorbs light in the UVA, UVB and UVC regions of the electromagnetic spectrum. In an embodiment of the invention, the UV absorbing compounds in the nanoparticles are reacted and unreacted 1,3-diphenyl-1,3-propanedione (DP) and 2-(4-Benzoyl-3-hydroxyphenoxy)ethyl acrylate (BHPEA). The gel is the cross-linked product from the polymerization of an alkene containing monomer or monomer mixture, where the average monomer has at least two polymerizable alkene groups. In an exemplary embodiment of the invention, the alkene comprising monomer is propoxylated glyceryl triacrylate (PGT).

In an embodiment of the invention, the UV absorbing nanoparticles are prepared by polymerizing a mixture of: at least one alkene comprising monomer, where the average monomer has a plurality of alkene units; a free radical initiator; a plurality of UV absorbing compounds; and at least one chain transfer agent. The polymerization is stopped before complete gelation, a solvent is added, and dialysis is performed to separate the UV absorbing nanoparticles from any unreacted or unincorporated components of the polymerization mixture. In an exemplary embodiment of the invention, the alkene comprising monomer is propoxylated glyceryl triacrylate (PGT), the chain transfer agent is isooctyl 3-mercaptopropionate (CTA), the UV absorbing compounds are 1,3-diphenyl-1,3-propanedione (DP) and 2-(4-Benzoyl-3-hydroxyphenoxy)ethyl acrylate (BHPEA), and the free radical initiator is benzoyl peroxide.

Another embodiment of the invention is a UV blocking appliance comprising the UV absorbing nanoparticles described above. The appliance can be a hydrophilic gel or silicone-hydrogel; for example, the appliance can be a contact lens.

Another embodiment of the invention is a UV blocking appliance comprising the UV absorbing compound infused into a hydrophilic gel or silicone-hydrogel appliance, for example, a contact lens. Another embodiment of the invention is a method to form the UV blocking appliance comprising the UV absorbing compound. The method comprises soaking a UV blocking appliance in a solution comprising the UV absorbing compound and a solvent that swells the appliance.

Another embodiment of the invention is a method for the preparation of the UV absorbing nanoparticles described above, where monomers having, on average, a plurality of polymerizable alkene groups per monomer, are combined with a free radical initiator, a UV absorbing compound, and a diluent and the combined mixture is polymerized in a non-aqueous solvent system or in an emulsion system comprising a surfactant and a aqueous solution. The diluent can be an oil, for example, vitamin E. The UV absorbing nanoparticles can be separated from the polymerization mixture by centrifugation.

Another embodiment of the invention is a method for the preparation of the UV blocking appliance by polymerizing alkene comprising monomers to a gel, where the average number of alkene groups per monomer is greater than 1, in a free radical polymerization with the UV absorbing nanoparticles included in the polymerization mixture. An initiator is included that can be activated either by photolysis or thermolysis.

Another embodiment of the invention is a method for the preparation of the UV blocking appliance by soaking a gel appliance, such as a contact lens, in a suspension of the UV absorbing nanoparticles. The suspending liquid is a non-aqueous solvent that swells the gel appliance permitting diffusion of the UV absorbing nanoparticles into the appliance. The UV absorbing nanoparticles are trapped in the appliance upon removal of the non-aqueous solvent. The non-aqueous solvent can be removed from the swollen appliance as a volatile or can be extracted into an aqueous solution or water to trap the UV absorbing nanoparticles in the UV blocking appliance.

In an embodiment of the invention, the UV blocking appliance is formed by polymerizing an alkene comprising monomer mixture having a multiplicity of UV absorbing nanoparticles, and a free radical initiator. The free radical initiator can be a photoinitiator or a thermal initiator. In another embodiment of the invention, the UV blocking appliance is formed by soaking a hydrophilic or silicone-hydrogel appliance in a non-aqueous dispersion of UV absorbing nanoparticles such that the nanoparticles can enter the swollen appliance and are trapped within the appliance upon removing of the solvent from the swollen apparatus.

BRIEF DESCRIPTION OF THE DRAWINGS

FIG. 1A shows an emulsion micelle shown at early stages of polymerization, which evolves; FIG. 1B shows an emulsion micelle containing several nanoparticles with high concentration of diluents in the unpolymerized liquid; and FIG. 1C shows a final emulsion with several micelles containing several nanoparticles.

DETAILED DESCRIPTION OF THE INVENTION

Embodiments of the invention are directed to UV absorbing appliances comprising UV absorbing compounds infused in visibly transparent appliances, such as contact lenses. In an embodiment of the invention, the UV absorbing compound is absorbed in the UV blocking appliance by soaking the appliance in a solution of the UV absorbing compound for a sufficient period to partition the UV absorbing compound into the appliance and removing solvent absorbed by the UV absorbing appliance.

UV absorbing compounds that can be infused into swollen appliances, for example commercially available contact lenses, which have a desired structure and cross-link density that is well established in the industry, must be those which remain in the resulting UV absorbing appliance and are not readily partitioned into a aqueous solution or are a compound that is benign or advantageous to an organism. In an embodiment of the invention, the UV absorbing compound is 1,3-diphenyl-1,3-propanedione (DP). In an embodiment of the invention, the UV absorbing compounds are 1,3-diphenyl-1,3-propanedione (DP) and 2-(4-Benzoyl-3-hydroxyphenoxy)ethyl acrylate (BHPEA).

Figure 1:
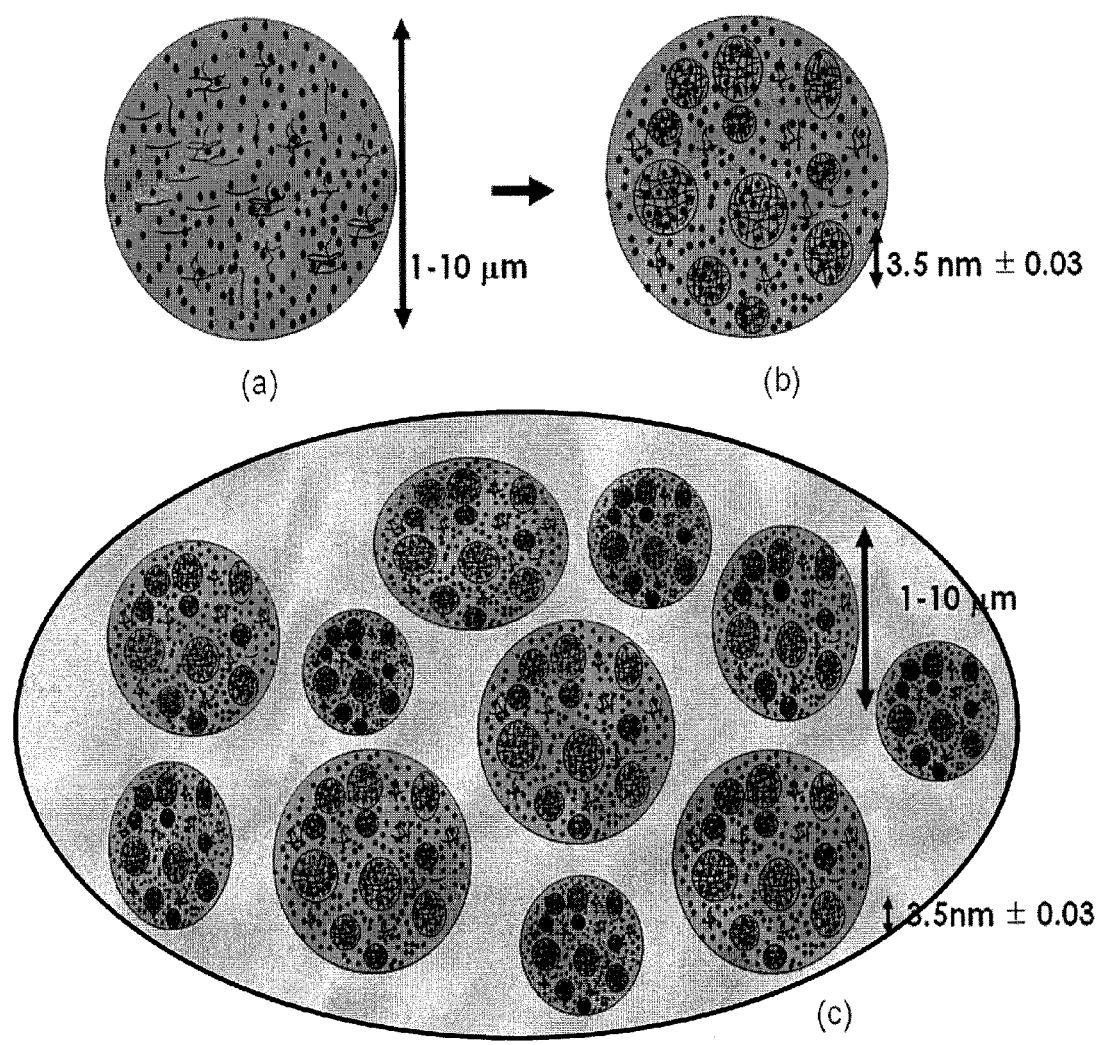
FIGS. 1A-1C are schematic illustrations of the mechanism of formation of highly crosslinked nanoparticles in the presence of a diluent where

Embodiments of the invention are directed to UV absorbing material encapsulated in nanoparticles and appliances, such as contact lenses, including these UV absorbing nanoparticles to form the UV absorbing appliances. By use of the UV absorbing nanoparticles, UV absorbing compounds are more permanently fixed within a UV absorbing appliance than are any given UV absorbing compound that is not fixed in a nanoparticle. The UV absorbing nanoparticles comprise any available monomeric or oligomeric UV absorbing compound where the absorber is locked within a highly crosslinked nanoparticle such that leaching of the UV absorber can not occur from the nanoparticle, and, therefore, from any appliance in which it is incorporated, such as, but not limited to, a lens. In one embodiment, as shown in FIG. 1, a highly crosslinked nanoparticle is formed in the presence of a diluent where (a) an emulsion micelle evolves into (b) an emulsion micelle containing several nanoparticles with high concentration of diluents in an unpolymerized liquid, and (c) finally evolves into an emulsion with several micelles containing several nanoparticles.

Figure 2:
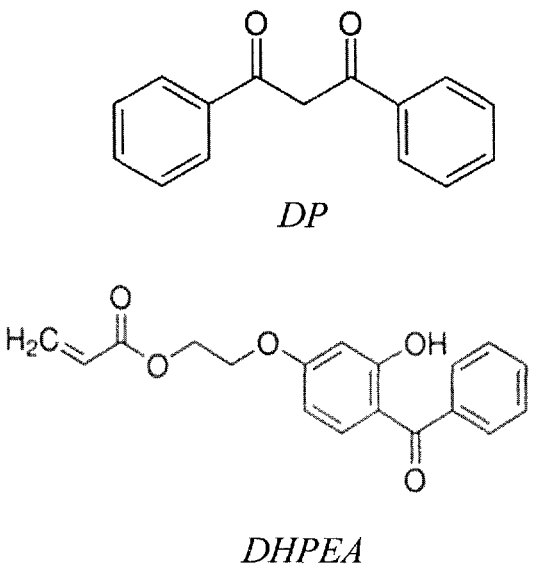
FIG. 2 shows the chemical structure of UV absorbing compounds 1,3-diphenyl-1,3-propanedione (DP) and 2-(4-Benzoyl-3-hydroxyphenoxy)ethyl acrylate (BHPEA), which are incorporated into UV absorbing nanoparticles, according to an embodiment of the invention.

In an embodiment of the invention, two UV blocking molecules are included in the nanoparticle formulation to maximize blocking of UVA and UVB radiation. The two molecules 1,3-diphenylpropane-1,3-dione (DP) and 2-(4-Benzoyl-3-hydroxyphenoxy)ethyl acrylate (BHPEA), as shown in FIG. 2, are optimal for blocking UVA and UVB, respectively. A formulation with these two molecules is optimal for achieving Class 1 UV blocking with minimal loading. BHPEA can be polymerized into the nanoparticle structure and, therefore, will not diffuse from the lens on insertion in the eye. Similarly, DP acts as a chain transfer agent, as it is capable losing a hydrogen atom to form a free radical that initiates a chain and covalently attaches to the particle. Furthermore, DP is highly hydrophobic and free DP release into tears is minimal. In an embodiment of the invention, a very small pore size rigid particle is formed by using a tri-functional monomer for the preparation of the particles. DP is highly biocompatible with useful medical properties, including potential benefits in cancer prevention and therapy.

In an embodiment of the invention, the UV absorbing nanoparticles comprising appliances can be formed by inclusion of the nanoparticles in the polymerization mixtures that form the appliances. In another embodiment of the invention, the nanoparticles, when sufficiently small, can be infused into the formed appliance in a solution process. The particles can be loaded into the appliance from a medium comprising a non-aqueous, but water soluble, solvent that sufficiently swells at least a portion of the lens to allow the nanoparticles to diffuse into the appliance. After particle loading, the appliance is soaked in an aqueous solution, for example, a saline solution, to extract the loading medium. As the loading medium is extracted, the medium swollen pores of the appliance contract to dimensions that trap the UV absorbing nanoparticles within the appliance. The trapped particles cannot diffuse from the appliance into the aqueous solution because the non-aqueous solvent is rapidly lost from the swollen appliance relative to the rate of migration of the UV absorbing nanoparticles through the pores of the appliance, such that the decreasing pore size achieved does not permit diffusion from the appliance after extraction of the non-aqueous solvent.

According to an embodiment of the invention, the bulk or surface composition of the UV absorbing nanoparticles can be matched to the structure of a portion of the appliance, for example, a nanoparticle gel composition that displays a complementary hydrophobicity, charge, or other property that promotes the nanoparticle's interaction with a material within the appliance. This unique approach of loading the UV absorber to a prepared contact lens, or other UV absorbing appliance, allows the lens to be prepared as is currently carried out without concern of unfavorable consequences in the rate, degree, or uniformity of curing imposed on the established process.

UV absorbing nanoparticles that can be infused into swollen appliances, for example, commercially available contact lenses, which have a desired structure and cross-link density that is well established in the industry, must be extremely small. UV absorbing nanoparticles, according to an embodiment of the invention are less than about 10 nm in cross-section, and are highly crosslinked such that no significant swelling of the nanoparticles occurs during swelling and delivery of the UV absorbing nanoparticles. Additionally, the very high cross-link density also assures that UV absorbers do not diffuse from the nanoparticle. According to an embodiment of the invention, the UV absorbing nanoparticles are formed by a surfactant free process.

The contact lens material can be a silicone hydrogel as described in International Application No. PCT/US2008/065325; filed May 30, 2008, published on Dec. 11, 2008 as WO 2008/151019 and hereby incorporated by reference herein in its entirety, including any figures, tables, or drawings. The contact lens material can also be any material used in soft contact lenses; such a hydroxyethylmethacrylate (HEMA) based lenses. The contact lens material can be a single phase, as in a homopolymer or random copolymer, or can consist of a plurality of discontinuous phases as is common of many block copolymers, such as silicone hydrogels. Commercially available silicone hydrogel contact lenses can be employed in embodiments of the invention. Silicone hydrogel contact lenses that are available commercially including: ACUVUE® ADVANCE™ (Johnson & Johnson Vision Care, Inc., Jacksonville, Fla.); ACUVUE® OASYS™ (Johnson & Johnson Vision Care, Inc., Jacksonville, Fla.); NIGHT&DAY™ (Ciba Vision Corp., Duluth, Ga.); O₂OPTIX™ (Ciba Vision Corp., Duluth, Ga.); and PureVision™ (Bausch & Lomb, Inc., Rochester, N.Y.). The commercially available lenses can be modified by incorporating the UV absorbing nanoparticles.

Silicone hydrogels can be prepared in a manner similar to that common to preparation of such networks, where hydrophobic silicon containing monomers are included into the formulation and the silicone monomer is copolymerized with monomers to provide hydrophilic character to the resulting network. Usually a silicone monomer that can undergo addition into the growing polymer at two sites or more is included. Such silicone hydrogels are non-homogeneous structures, often displaying discernable phase separation between a silicone rich phase and a hydrophilic monomer derived phase. Depending upon the nature of these hydrogels, surface treatment is sometimes necessary to assure the surface is sufficiently hydrophilic even though these hydrogels are designed to incorporate 20 to more than 80 percent by weight water. Surface treatment can include coating with a hydrophilic coating or plasma etching to convert the silicon surface into a hydroxy group rich silicate type surface.

Suitable silicone hydrogel materials include, without limitation, silicone hydrogels made from silicone macromers such as the polydimethylsiloxane methacrylated with pendant hydrophilic groups described in U.S. Pat. Nos. 4,259,467; 4,260,725 and 4,261,875; or the polydimethylsiloxane macromers with polymerizable functional described in U.S. Pat. Nos. 4,136,250; 4,153,641; 4,189,546; 4,182,822; 4,343,927; 4,254,248; 4,355,147; 4,276,402; 4,327,203; 4,341,889; 4,486,577; 4,605,712; 4,543,398; 4,661,575; 4,703,097; 4,740,533; 4,837,289; 4,954,586; 4,954,587; 5,034,461; 5,070,215; 5,260,000; 5,310,779; 5,346,946; 5,352,714; 5,358,995; 5,387,632; 5,451,617; 5,486,579; 5,962,548; 5,981,615; 5,981,675; and 6,039,913. The silicone hydrogels can also be made using polysiloxane macromers incorporating hydrophilic monomers such as those described in U.S. Pat. Nos. 5,010,141; 5,057,578; 5,314,960; 5,371,147; and 5,336,797; or macromers comprising polydimethylsiloxane blocks and polyether blocks such as those described in U.S. Pat. Nos. 4,871,785 and 5,034,461. All of the cited patents are hereby incorporated in their entireties by reference.

Among the silicone containing monomers which may be in the formulation of a silicone hydrogel of the present invention include oligosiloxanylsilylalkyl acrylates and methacrylates containing from 2-10 Si-atoms. Typical representatives include: tris(trimethylsiloxysilyl)propylmethacrylate, triphenyldimethyldisiloxanylmethylmeth-acrylate, pentamethyldisiloxanylmethylmethacrylate, tert-butyltetramethyldisiloxanyl-ethyl-methacrylate, methyldi(trimethylsiloxy)silylpropylglycerylmethacrylate; pentamethyldisiloxanylmethylmethacrylate; heptamethylcyclotetrasiloxanylmethylmeth-acrylate; heptamethylcyclotetrasiloxanylpropylmethacrylate; (trimethylsilyl)decamethyl-pentasiloxanylpropylmethacrylate; undecamethylpentasiloxanylpropylmethacrylate; and the acrylate equivalents of these methacrylates.

Other representative silicon-containing monomers which may be used for silicone hydrogels of the present invention include silicone-containing vinyl carbonate or vinyl carbamate monomers such as: 1,3-bis[4-vinyloxycarbonyloxy)but-1-yl]tetramethyldi-siloxane; 3-(trimethylsilyl)propyl vinyl carbonate; 3-(vinyloxycarbonylthio)propyl[tris-(trimethylsiloxy)silane]; 3-[tris(trimethylsiloxy)silyl]propyl vinyl carbamate; 3-[tris(trimethylsiloxy)silyl]propyl allyl carbamate; 3-[tris(trimethylsiloxy)silyl]propyl vinyl carbonate; t-butyldimethylsiloxethyl vinyl carbonate; trimethylsilylethyl vinyl carbonate; and trimethylsilylmethyl vinyl carbonate. Polyurethane-polysiloxane macromonomers (also sometimes referred to as prepolymers), which have hard-soft-hard blocks like traditional urethane elastomers, may be used. Examples of such silicone urethanes which may be included in the formulations of the present invention are disclosed in a variety or publications, including Lai, Yu-Chin, "The Role of Bulky Polysiloxanylalkyl Methacrylates in Polyurethane-Polysiloxane Hydrogels," Journal of Applied Polymer Science, Vol. 60, 1193-1199 (1996).

Suitable hydrophilic monomers that may be used separately or in combination for the silicone hydrogels of the present invention non-exclusively include, for example: unsaturated carboxylic acids, such as methacrylic and acrylic acids; acrylic substituted alcohols, such as 2-hydroxyethylmethacrylate, 2-hydroxyethylacrylate (HEMA), and tetraethyleneglycol dimethacrylate (TEGDMA); vinyl lactams, such as N-vinyl pyrrolidone; vinyl oxazolones, such as 2-vinyl-4,4'-dimethyl-2-oxazolin-5-one; and acrylamides, such as methacrylamide; and N,N-dimethylacrylamide (DMA). Still further examples are the hydrophilic vinyl carbonate or vinyl carbamate monomers disclosed in U.S. Pat. No. 5,070,215, and the hydrophilic oxazolone monomers disclosed in U.S. Pat. No. 4,910,277. Hydrophilic monomers may be incorporated into such copolymers, including, methacrylic acid, 2-hydroxyethylmethacrylamide.

The proportions of the monomers can vary over a large range. The polymerization mixtures can also include effective amounts of additives, initiators, photoinitiators, and/or catalysts and the reaction can be conducted in the presence of a diluent. Activation of the initiator for polymerization can be by thermal or photochemical means. The polymerization can occur via any ionic, radical or group transfer mechanism.

In embodiments of the invention, the UV absorbing appliances containing the UV absorbing compounds or UV absorbing nanoparticles can be used as a dosage form for delivering bioactive agents. Bioactive agents can include ocular drugs and nutraceuticals. Suitable drugs or mixtures of drugs for delivery by the contact lenses can be selected from, but are not limited to: glaucoma drugs such as timolol, pilocarpine, latanoprost; steroids such as dexamethasone and prednisilone; immunosuppressants such as cyclosporine; antibiotics such as ciprofloxacin, ciloxan and gentamycin; antiallergy drugs such ketotifen; and antiparisitic and antiprotzoal drugs such as ivermectin, and pyrimethamine. A nutraceutical or mixtures of nutraceuticals for delivery by the contact lenses can be selected from, but are not limited to: Vitamin B-1; Vitamin B-2; Vitamin B-3; Vitamin B-5; panthenol; pantothenic acid; Vitamin B-6; Vitamin B-8; Vitamin B-9; Vitamin B-12; Cobalamin; Folic Acid; Biotin; Choline Inositol; Para Amino Benzoic Acid; Ascorbic Acid; Vitamin C; Beta Carotene; Vitamin D; Vitamin E; Calcium; and salts that provide ionic Copper, Chromium, Iodine, Iron, Manganese, Magnesium, Molybdenum, Phosphorous, Potassium, Sodium, Selenium, and Zinc; colloidal minerals; chelated minerals; and RDA minerals. Mixtures of drugs and nutraceuticals can be delivered by the contact lens dosage form. Nutraceuticals are any non-drug compound that has a physiologically beneficial effect on the eye by improving the health of the eye or specifically preventing an ocular disease. In addition, some nutraceuticals, such as vitamin E, can impart a lubricating effect to reduce friction between the lens and the eye. The bioactive agents can be loaded in a manner where they are directly absorbed in the appliance, or where the bioactive agent is incorporated in a microparticle or a nanoparticle that can bi included in the appliance in a polymerization mixture for formation of the appliance, or by diffusion of nanoparticles into a preformed appliance. The microparticles or nanoparticles can be formed from one or more monomers that comprise, for example, the silicone or hydrogel phase of the silicone-hydrogel appliance. In general, the microparticles or nanoparticles will be of a different composition or cross-link density that is its compatible phase in a silicone-hydrogel appliance such as to attenuate its diffusion from the appliance when used for delivery of the bioactive agent.

It was discovered that, as with the UV absorbing compounds, UV absorbing nanoparticles can be loaded into an appliance, by soaking the lenses in solutions of the compounds in organic solvents such as ethanol. Non-limiting examples of such organic solvents include ethanol, ethyl acetate, butyl acetate isopropanol, n-propanol, DMSO, methanol, toluene, methylene chloride, and tetrahydrofuran. In general, the solvent should be one that has a low toxicity, is non-carcinogenic, and is non-mutanogenic or can be removed essentially in total from the silicone hydrogel by means commonly employed by those skilled in the art. Many hydrophobic compounds have some solubility in ethanol and so this solvent is most convenient. The solvents are generally, but not necessarily, removed prior to placement of the hydrogel into the ocular environment or other tissue to be treated. The solvent can be removed as a volatile off-gassing from the hydrogel and can be assisted separately or by any combination of vacuum, heating, and a gas stream.

In embodiments of the invention, diffusion barriers can be included in the UV absorbing appliance to decrease the rate of diffusion of any bioactive agent incorporated in the appliance with the UV absorbing nanoparticles. The diffusion attenuator can be any material where the bioactive agent has a sufficiently smaller diffusivity than its diffusivity in the contact lens material. The diffusion barriers can be a liquid or a solid. The diffusion attenuator material can be similar to the lens material, only differing, for example, by the repeating unit composition of a copolymer or by the cross-linking density, for example, a higher cross-link density, from that of the polymeric material used as the contact lens material. Diffusion attenuators can be diffusion barriers that can have many different shapes, for example disc, plates, spheroids, needles, rods, spheres and/or irregular flake.

MATERIALS AND METHODS

Materials

N,N-Dimethylacrylamide (DMA), 1-vinyl-2-pyrrolidone (NVP), Dulbecco's phosphate buffered saline (PBS) were purchased from Aldrich Chemicals (St Louis, Mo.). Propoxylated glyceryl triacrylate (PGT) was purchased from Sartomer; Benzoyl peroxide (BP) (97%) and 1,3-diphenyl-1,3-propanedione (DP) were purchased from Aldrich Chemicals (Milwaukee, Wis.). The macromer bis-alpha, omega-(methacryloxypropyl)polydimethylsiloxane (Macromer) was supplied by Clariant. 3-methacryloxypropyl-tris (trimethylsiloxy)silane (TRIS) was provided by Silar laboratories (Scotia, N.Y.). Methyacrylic acid (MAA) was purchased from Polysciences, Inc (Wattingyon, Pa.). 2,4,6-Trimethylbenzoyl-diphenyl-phosphineoxide (Darocur TPO) was provided by Ciba (Tarrytown, N.Y.). Vitamin E (D-alpha tocopherol, Covitol F1370) was provided by Cogins Corporation.

Transmittance Measurements

The transmittance of UV absorbing nanoparticle-laden silicone hydrogels was measured using an UV-Vis spectrophotometer (Thermospectronic Genesys 10 UV). After being hydrated by soaking in DI water overnight, lenses were mounted on the outer surface of a quartz cuvette. The cuvette was placed in a spectrophotometer and transmittance was measured at the wavelength range from 200 nm to 480 nm. Transmittance data was used to calculate the average absorption of UVC, UVB and UVA radiation, where the UVA range, is 315-380 nm as per ANSI classification and for the entire UVA spectrum of 315-400 nm.

Figure 3:
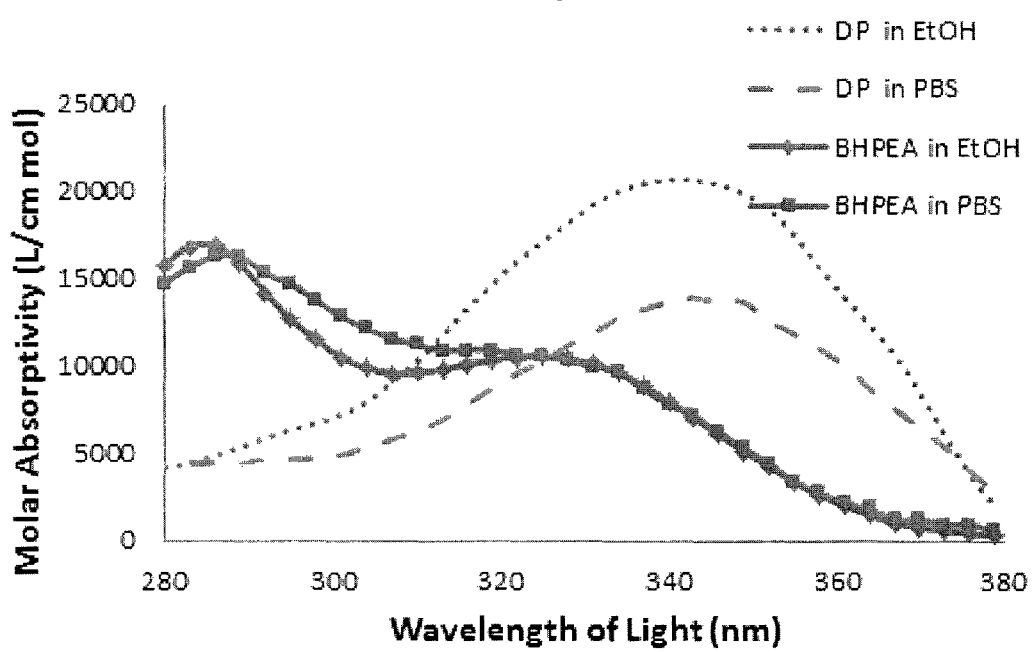
FIG. 3 shows the UV spectra of DP and BHPEA in ethanol and saline solution (PBS).

The UV blocking potential of DP and BHPEA was characterized by measuring the absorbance spectra in a UV-Vis spectrophotometer. Both molecules have limited solubility in water. The absorbance spectra was first measured in ethanol at a concentration of 0.02 mg/mL and then in water at a concentration of 0.001 mg/mL. The absorbance spectra ($A(\lambda)$) was used to calculate the molar absorptivity ($\epsilon$) using the Beer Lambert law, i.e., $A=\epsilon c l$, where $l=1$ cm is the path length and c is the concentration in solution. The molar absorptivities of both DP and BHPEA are plotted in FIG. 3.

Nanoparticle Preparation

The UV blocker 1,3-diphenyl-1,3-propanedione (DP) was incorporated into highly crosslinked particles of propoxylated glyceryl triacrylate (PGT). Since PGT has three vinyl groups, nanoparticles of PGT will have extremely small pore size, thereby trapping DP molecules irreversibly. The DP loaded PGT nanoparticles were prepared using a diluent as a polymerization modifier. Vitamin E was chosen as the diluent due to its hydrophobicity and biocompatibility. To prepare the nanoparticles, DP, PGT and Vitamin E were mixed in the desired ratios and added to 7.5 mg of polymerization initiator BP. The mixture was added to DI water, purged with nitrogen for 15 minutes to remove dissolved oxygen, and heated in an 80° C. hot water bath with stirring at 1100 rpm for 8 hours. The thermal polymerization results in formation of UV blocking nanoparticles. The particles are separated from the suspension by centrifugation for 15 min.

The compositions used for preparation of nanoparticles are listed in Tables 1, below. In each composition, varying amounts of the UV dye, DP, were added to 120 mg of Vitamin E, 1 g of PGT and 7.5 mg of BP. The amount of DP was varied from 10 to 210 mg to create particles with DP fractions ranging from about 1% to 15.8%. To further increase the DP fraction an increase of the Vitamin E fraction was needed. Accordingly, 280 or 450 mg of DP was added to 150 mg Vitamin E, 1 g of PGT, and 7.5 mg BP to produce nanoparticles with DP loadings of about 19.6 and 28.1%, respectively.

TABLE 1

Experimental design of particles in polymerization mixture.

| UV dye in particle (%) | Mass UV dye (mg) | Mass Vitamin E (mg) | % particles in silicone hydrogel |
|---|---|---|---|
| 1 | 10 | 120 | 5, 10 |
| 2.6 | 30 | 120 | 5, 10, 20 |
| 5.9 | 70 | 120 | 5, 10 |
| 9.7 | 120 | 120 | 5 |

Other nanoparticles were prepared by bulk polymerization of a tri vinyl monomer propoxylated glyceryl triacrylate (PGT), the two UV blocking molecules, DP and BHPEA, and a chain transfer agent, isooctyl 3-mercaptopropionate (CTA). UV blocking nanoparticles were formed by mixing PGT, BHPEA, DP, and isooctyl 3-mercaptopropionate in desired ratios along with 0.1% by weight benzoyl peroxide. As an example, a mixture of 40% PGT, % chain transfer agent, 10% BHPEA and 10% DBM was made followed by addition of 0.1% initiator BP. $N_2$ was bubbled through the mixture for 15 minutes to remove oxygen followed by heating to 80° C. for 4 hours. In some cases, the polymerization time was reduced to avoid gelation.

Polymerization solutions containing the nanoparticles also contained unreacted components and small polymer chains. Two stages of dialysis were used to remove the undesired components from the solution of nanoparticles. In a first dialysis, the polymerized solution was placed inside a dialysis bag with 12,000 Da cutoff, and the bag was submerged in a mixture of 75% ethanol and 25% acetone for a period of 16 hours. After 16 hours, the solution inside the bag was withdrawn and placed into a fresh dialysis bag for a second dialysis. In each stage, the volume of the outer solution was 20 times the volume of the liquid inside the bag. After 16 hours of the second stage of the dialysis, the absorbance spectra of the outer solution ($A_o$) and the solution in the bag ($A_i$) were measured to determine composition and conversion.

The absorbance spectra can be expressed as a sum of the absorbance from various components in the solution, by the equation:

$$A(\lambda) = (\Sigma \epsilon_i c_i) l$$  Equation I, where $\epsilon_i$ and $c_i$ are the molar absorptivity and concentration of the $i^{th}$ component, l is the path length, and the sum is carried over all the components in the solution. Due to the very high absorbance from BHPEA and DP, one can neglect the absorbance contributions from all other components. Since the molar absorptivity of BHPEA and DP are known and l is fixed at 1 cm, the absorbance spectra depend on only the concentrations of BHPEA and DP, according to the equation:

$$A(\lambda) = (\epsilon_{DBM} c_{DMB} + \epsilon_{BHPEA} c_{BHPEA}) l$$  Equation II.

The unknown concentrations can be determined by a least square fit between the measured absorbance and the absorbance based on the above equation for wavelengths ranging from 250 to 350 nm.

Figure 4:
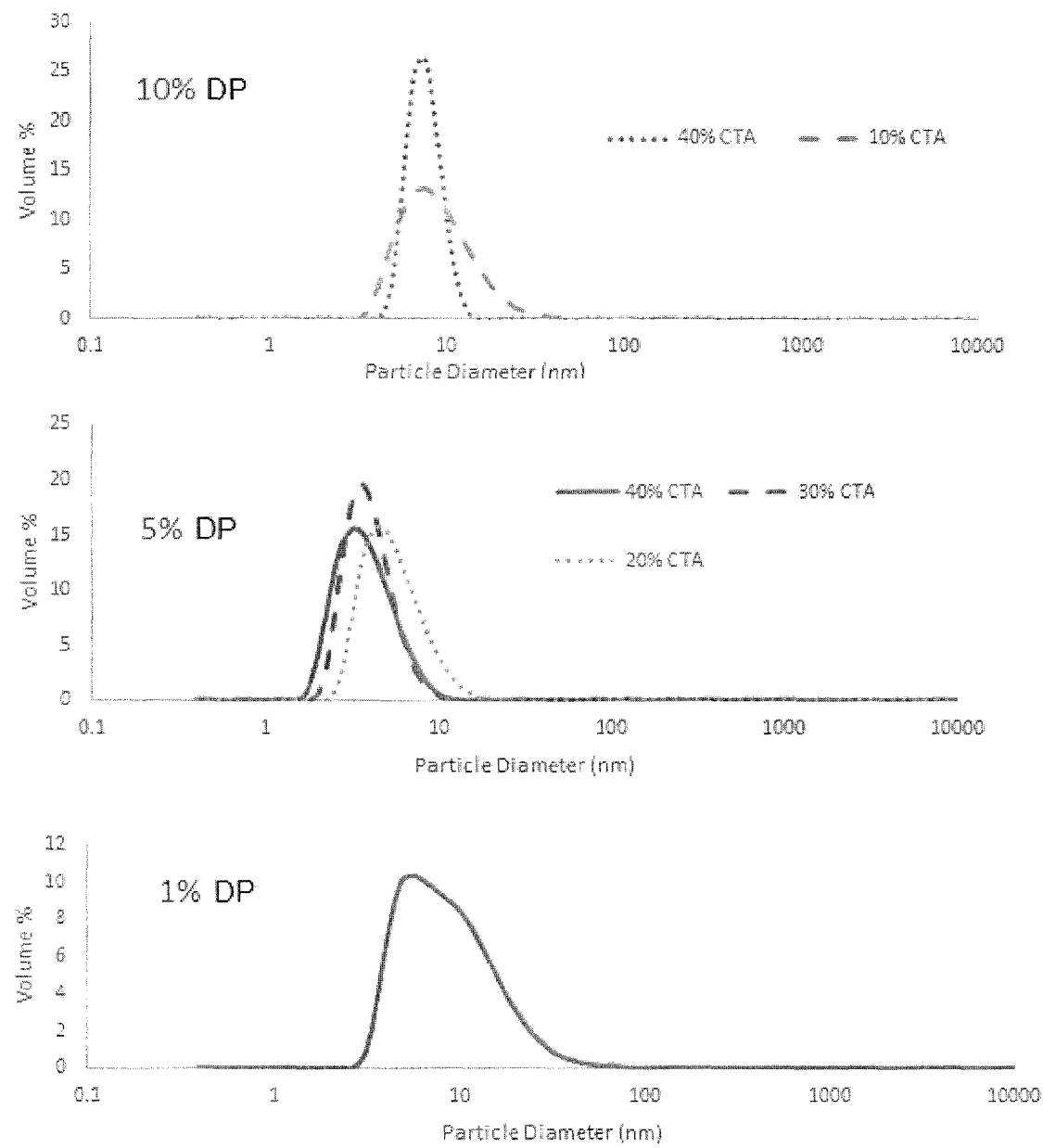
FIG. 4 shows the mean particle size for UV absorbing nanoparticles, according to an embodiment of the invention, having different BP loadings with the compositions given in Table 1.

The concentrations of BHPEA and DP are determined in the solution from the bag and that from the outer solution. In general, only unreacted components diffuse through the dialysis bag, and, therefore, concentrations of BHPEA and DP are higher in the solution in the bag. The difference between the inside and the outside concentration represents the nanoparticle-incorporated concentrations. By dividing the nanoparticle incorporated concentrations of DP and BHPEA, we can obtain the ratio of these two components in the nanoparticles. The solution from inside the bag was used for measuring the particle size distribution by dynamic light scattering. Table 2, below, summarizes the formulations used for the particle preparation and Table 3, below, summarizes the concentrations of the two components in the inner and outer solutions after the second dialysis. Formulation 1 (F1) was repeated three times to check for reproducibility and twice using a larger reaction volume. Formulation 1 was used for loading particles into contact lenses. Table 2 includes the particle-incorporated concentration of the two components, and the mean particle size. The size distributions for representative formulations are included in FIG. 4.

TABLE 2

Formulations used for particle preparation by wt %

| Formulation | F1 | F2 | F3 | F4 | F5 | F6 |
|---|---|---|---|---|---|---|
| % BHPEA | 10 | 10 | 10 | 10 | 10 | 10 |
| % DP | 10 | 10 | 5 | 5 | 5 | 1 |
| % CTA | 40 | 10 | 20 | 30 | 40 | 40 |
| % PGT | 39.9 | 69.9 | 64.9 | 54.9 | 44.9 | 48.9 |
| % Initiator | 0.1 | 0.1 | 0.1 | 0.1 | 0.1 | 0.1 |

TABLE 3

Concentrations inside and outside dialysis bags, concentration incorporated into particles, and particle size

| Formulation in mg/mL | F1 | F1 Scale Up | F2 | F3 | F4 | F5 | F6 |
|---|---|---|---|---|---|---|---|
| BHPEA Inside | 2.45 +/− 0.36 | 2.67 +/− 0.09 | 2.13 | 2.22 | 1.86 | 2.08 | 2.34 |
| BHPEA outside | 0.18 +/− 0.01 | 0.3 +/− 0.01 | 0.29 | 0.20 | 0.21 | 0.17 | 0.19 |
| BHPEA incorporated | 2.27 +/− 0.36 | 2.38 +/− 0.1 | 1.84 | 2.02 | 1.65 | 1.90 | 2.15 |
| DP Inside | 0.17 +/− 0.02 | 0.33 +/− 0.05 | 0.28 | 0.02 | 0.10 | 0.15 | 0.16 |
| DP outside | 0.12 +/− 0.01 | 0.25 +/− 0.01 | 0.29 | 0.02 | 0.08 | 0.12 | 0.11 |

TABLE 3-continued

Concentrations inside and outside dialysis bags, concentration incorporated into particles, and particle size

| Formulation in mg/mL | F1 | F1 Scale Up | F2 | F3 | F4 | F5 | F6 |
|---|---|---|---|---|---|---|---|
| DP incorporated | 0.05 +/− 0.01 | 0.08 +/− 0.06 | 0.00 | 0.00 | 0.02 | 0.04 | 0.05 |
| Particle Size (nm) | 7.57 | 2.66 | 10.44 | 5.70 | 4.10 | 4.04 | 10.9 |

Particle Size Distribution

The highly crosslinked UV absorbing nanoparticles are hydrophobic and are either dispersed in non-aqueous liquids like ethanol or in water containing a surfactant for the measurements of particle size distribution. Both aqueous solutions and ethanol solutions were transparent, suggesting that the particle size is less than the wavelength of visible light. A mean particle size of about 3.5 nm was determined in both mediums. The size measurements clearly indicated that the size of the particles is independent of the size of the emulsion drops, but is controlled by the effect of the diluent on the polymerization dynamics. Not to be bound by theory, below is a hypothetical mechanism for the formation of diluent encapsulated nanoparticles when a mixture of hydrophobic oily monomer (multifunctional monomers) is polymerized in an oily diluent (vitamin E).

Mechanism for Particle Formation

Nanoparticle formation is consistent with free radical polymerization of multifunctional monomers, such as EGDMA or PGT, where intramolecular addition occurs to form and grow individual polymer nanogels because the diluent has a much lower affinity for the growing polymer than for the monomer mixture, which promotes intramolecular addition over intermolecular addition. In the emulsion polymerization, several nanogels form in each emulsion drop and each nanogel encapsulates some UV absorber, and excludes diluent to a large extent. Rapidly, the nanoparticles reactive alkene groups become sufficiently low such that coalescence of the nanogels ceases and the microdrops of the emulsion contain a multiplicity of nanogel particles.

This nanoparticle preparation method requires a careful optimization of the type and concentration of diluents. If the diluents concentration falls below a critical value, the growing nanogels in each drop merge and with polymerization result in a microgel of the size of the drop. A number of oils were successfully used as diluents, including vitamin E, olive oil, timolol base (a glaucoma drug), and 1,3-diphenyl-1,3-propanedione (UV absorber).

Preparation of Silicone Gels

Extended wear contact lenses were prepared from silicone hydrogels to obtain high oxygen and ion diffusion. The silicone gels were synthesized by free radical polymerization of a mixture of a silicone monomer with a hydrophilic monomer. Additionally a macromer is added to ensure solubilization of the silicone and the hydrophilic monomers. Other components such as NVP can be added to increase the water content. A silicone hydrogel was prepared by combining 0.8 ml of macromer (bis-alpha,omega-(methacryloxypropyl)polydimethylsiloxane) with 0.56 ml of N,N-dimethylacrylamide (DMA), 0.24 ml of methacrylic acid (MAA), 0.8 ml of 3-methacryloxypropyl-tris(trimethylsiloxy)silane (Tris), 0.12 ml of 1-vinyl-2-pyrrolidone (NVP) and 10 μl of propoxylated glyceryl triacrylate (PGT). The mixture was purged by bubbling nitrogen through the mixture for 15 minutes. After adding 0.012 g of the initiator Darocur® TPO to the mixture with stirring for 5 minutes, the mixture was poured between two glass plates separated by a 100 μm thick plastic spacer. The mold was placed on an Ultraviolet transilluminiator UVB-10 (Ultra•Lum, Inc.) and irradiated with UVB light (305 nm) for 50 minutes. The molded gel was cut into circular pieces (about 1.65 cm in diameter) using a cork borer and dried in air overnight.

Preparation of UV Absorbing Appliances by Infusion of UV Absorbing Compounds.

Figure 5:
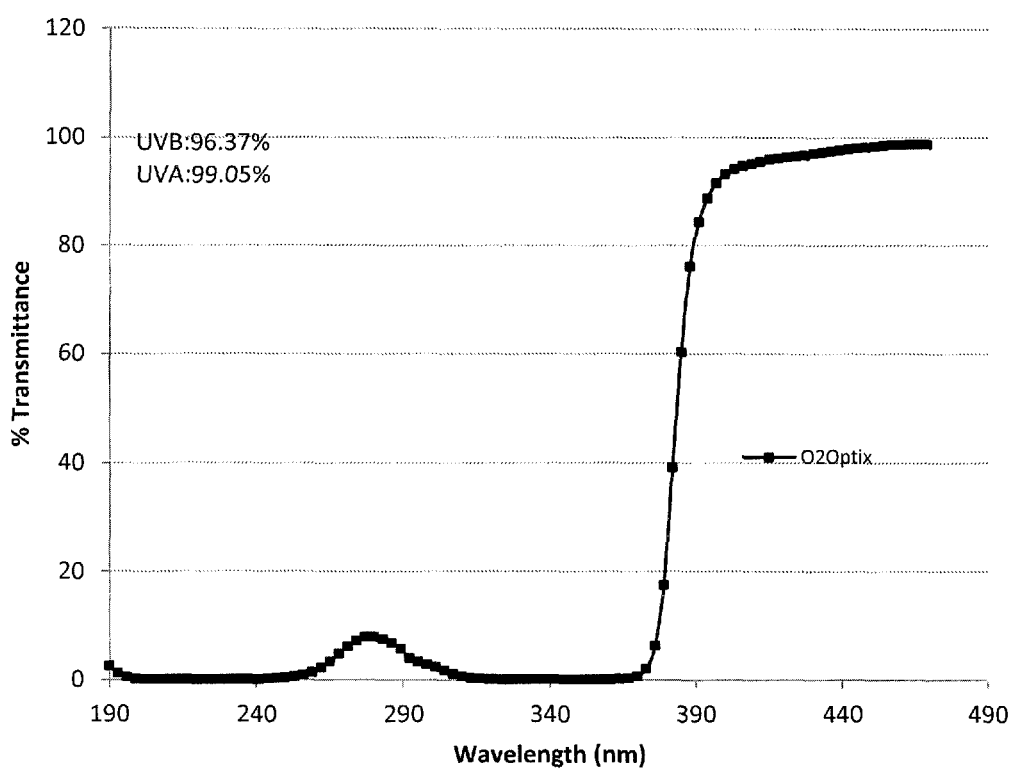
FIG. 5 shows percent transmittance spectra for appliances according to an embodiment of the invention formed from soaking an O2OPTIX® silicon hydrogel lens in a 0.7% w/w solution of 1,3-diphenyl-1,3-propanedione (DP) in ethanol, according to an embodiment of the invention.

UV absorbing contact lenses were prepared by loading O2OPTIX® silicone hydrogel lenses with 1,3-diphenyl-1,3-propanedione (DP). The O2OPTIX lenses were soaked individually in 3 ml of ethanol solution of DP with a DP concentration of 0.7% w/w. After three hours of soaking, the lenses were withdrawn and submerged in 200 ml of DI water for two hours, which extracted ethanol from the silicon hydrogels. The lenses were gently wiped and then stored in 5 ml of DI water. The transmittance of the lenses loaded with DP was measured by UV Vis spectrophotometry, where the resulting spectrum is shown in FIG. 5. The lenses were visible light transparent and exhibited strong UV blocking with an average blocking of 99.05% of UVA and 96.37% of UVB allowing the lenses to be defined as Class 2 blocker. The absorbance in UVB region can be increased beyond 99% by increasing the DP concentration in ethanol to about 2% making the lens a Class 1 blocker. The leaching of DP is very limited due to its very high hydrophobicity and very low solubility in aqueous medium.

Nanoparticles Added to the Polymerization Mixture

Silicone hydrogels with UV absorbing nanoparticles were prepared with varying amounts of DP nanoparticles added to the composition described above. Specifically, 0.13, 0.25, or 0.504 g of DP loaded nanoparticles were added to a mixture of 0.8 ml of macromer (bis-alpha,omega-(methacryloxypropyl)polydimethylsiloxane), 0.56 ml of N,N-dimethylacrylamide (DMA), 0.24 ml of methacrylic acid (MAA), 0.8 ml of 3-methacryloxypropyl-tris(trimethylsiloxy)silane (Tris), 0.12 ml of 1-vinyl-2-pyrrolidone (NVP), and 100 μl of Propoxylated glyceryl triacrylate (PGT). The mixture was purged by bubbling nitrogen through the mixture for 15 minutes. After adding 0.012 g of initiator (Darocur® TPO) with stirring for 5 minutes, the mixture was poured between two glass plates separated by a 100 μm thick plastic spacer. The molds were then placed on Ultraviolet (Ultra-Lum, Inc.) and irradiated with UVB light (305 nm) for 2 hours. The duration of polymerization was chosen to be longer due to the attenuation in UV intensity because of the absorption by the UV absorbing particles. The conditions for DP loading in the nanoparticles and the nanoparticle loading in the polymerization mixture are presented in Table 1, above.

As the UV blocking particles inhibit UV initiated polymerization, thermally initiated polymerization was used in some cases to cure the gel. The mold was placed in an oven at 80° C. for 24 hrs to polymerize the gel. The thermal polymerization was used for a 5% UV absorbing nanoparticle loading where the nanoparticles contained 5.9% DP, and the thickness of the molded gel was 200 microns.

Loading UV Blocking Nanoparticles into Preformed Contact Lenses

After the second dialysis, the solution in the bag was directly used for the contact lens loading or was concentrated by evaporation of the solvent. Night & Day™ contact lenses were soaked in a 1 ml solution of nanoparticles in 50:50 ethanol:acetone for a period of 5 min or 24 hours. The concentration of particles in the solution was varied from about 0.5% to 3%. The compositions of the solutions used in the lens loading are given in Table 4, below. All solutions were prepared by concentrating the particles formed by polymerization of formulation 1. After 5 min. or 24 hours, the lenses were withdrawn from the solutions, briefly rinsed in pure acetone to remove any surface particles, and submerged in DI water.

TABLE 4

Composition of solutions used in lens loading

| | Sample # | | | | |
|---|---|---|---|---|---|
| | 1 | 2 | 3 | 4 | 5 |
| Total BHPEA (mg/ml) | 8.30 | 7.01 | 11.74 | 25.87 | 27.61 |
| Reacted BHPEA (mg/ml) | 7.60 | 6.46 | 11.03 | 22.79 | 24.79 |
| Unreacted BHPEA (mg/ml) | 0.70 | 0.55 | 0.71 | 3.08 | 2.82 |
| Ratio React/Unreact BHPEA | 10.89 | 11.64 | 15.56 | 7.40 | 8.79 |
| Total DP (mg/ml) | 0.61 | 0.48 | 0.77 | 2.83 | 3.83 |
| Reacted DP (mg/ml) | 0.15 | 0.15 | 0.25 | 0.26 | 1.40 |
| Unreacted DP (mg/ml) | 0.46 | 0.33 | 0.52 | 2.57 | 2.43 |
| Ratio Reacted/Unreacted DP | 0.32 | 0.45 | 0.47 | 0.10 | 0.58 |

Effect of Nanoparticle Loading on UV Blocking

The transmission spectra in the 200 nm to 480 nm range from the control silicone hydrogel and those from gels loaded with UV absorbing nanoparticles by addition of nanoparticles particles to the polymerization mixture are shown in FIGS. 6 to 10. Each figure corresponds to particles with a fixed loading of the UV absorber and the various curves in each figure correspond to different loading of the UV absorbing nanoparticles in the gels. Average absorbance was calculated in the UVA, UVB and UVC ranges and these averages are listed in Tables 5-8, below. For the UVA range, average absorbance is determined for the range of 315-380 (Table 7) and 315-400 (Table 8).

TABLE 5

Percentage of UVC (below 280 nm) absorbed by nanoparticle laden silicone gels.

| | % Nanoparticles/gel | | |
|---|---|---|---|
| % UV dye/nanoparticle | 5 | 10 | 20 |
| 1 | 98.6 | | 99.9 |
| 2.6 | 99.0 | 99.9 | 99.9 |
| 5.9 | 99.6, 99.9 (thermo) | 99.9 | |
| 9.7 | 99.9 | | |

TABLE 6

Percentage of UVB (280-315 nm) absorbed by nanoparticle laden silicone gels.

| | % Nanoparticles/gel | | |
|---|---|---|---|
| % UV dye/nanoparticle | 5 | 10 | 20 |
| 1 | 79.6 | | 99.2 |
| 2.6 | 83.6 | 99.2 | 99.9 |
| 5.9 | 99.5, 99.9 (thermo) | 99.9 | |
| 9.7 | 99.9 | | |

TABLE 7

Percentage of UVA (315-380 nm) absorbed in nanoparticle laden silicone gels.

| | % Nanoparticles/gel | | |
|---|---|---|---|
| % UV dye/nanoparticle | 5 | 10 | 20 |
| 1 | 61.00 | | 95.95 |
| 2.6 | 90.63 | 98.16 | 99.36 |
| 5.9 | 98.0, 99.84 (thermo) | 99.53 | |
| 9.7 | 99.66 | | |

TABLE 8

Percentage of UVA (315-400 nm) absorbed in nanoparticle laden silicone gels.

| | % Nanoparticles/gel | | |
|---|---|---|---|
| % UV dye/nanoparticle | 5 | 10 | 20 |
| 1 | 50.86 | | 81.82 |
| 2.6 | 67.78 | 84.00 | 86.72 |
| 5.9 | 83.09, 91.90 (thermo) | 87.24 | |
| 9.7 | 94.15 | | |

Figure 6:
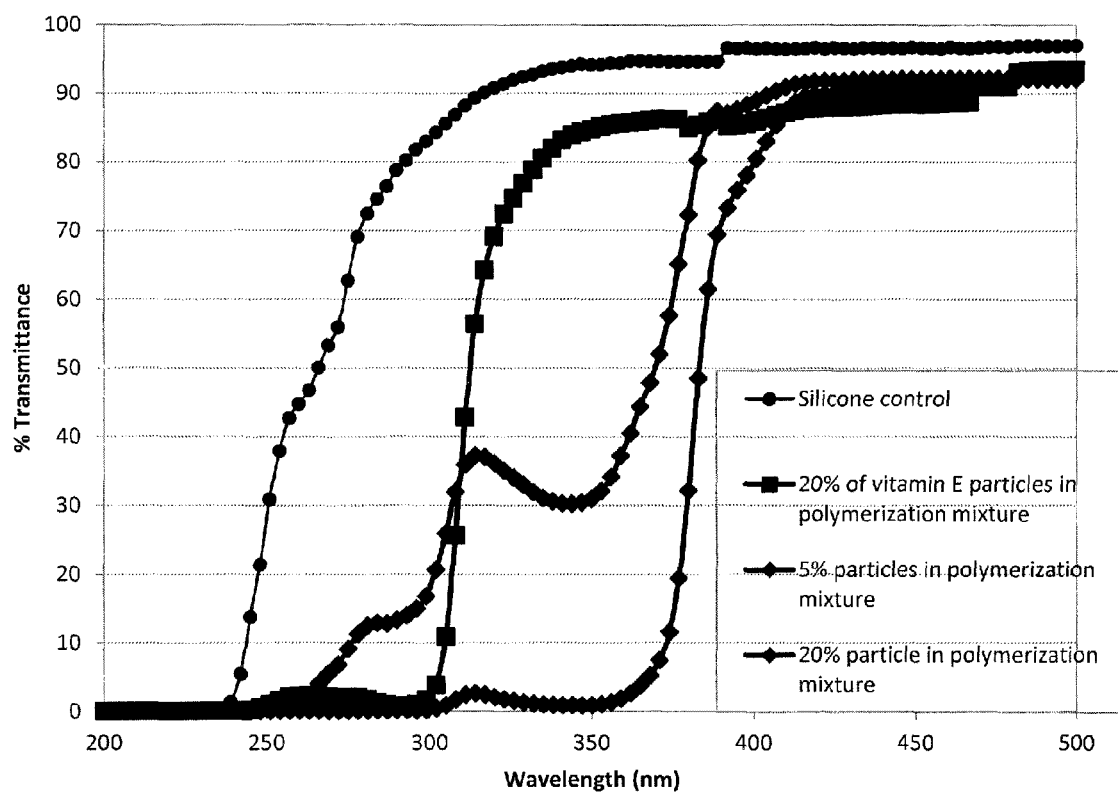
FIG. 6 shows percent transmittance spectra for appliances according to an embodiment of the invention formed from 1% DP containing nanoparticles dispersions in a silicone polymerization mixture at various nanoparticle contents and for DP free nanoparticles relative to a control appliance free of nanoparticles.

FIG. 6 shows absorption spectra (% absorption) from 200 nm to 480 nm for gels loaded with varying percentage of nanoparticles with about 1% DP in the particles. The data shows significant reduction in transmittance in the UV range due to loading DP containing nanoparticles in the gels. The transmittance decreases with an increasing in the particle loading, but the decrease is non linear. The average absorption for the UVA, UVB and UVC ranges listed in Tables 5-8 show that gels loaded with 20% particles achieve class 1 UV blocking classification. FIG. 6 includes the absorption spectra from gels loaded with 20% particles that did not contain DP. These gels also exhibit some reduction in UV transmission, due to the UB blocking from vitamin E encapsulated in the particles. However the UV blocking from particles with vitamin E is significantly less than that with particles loaded with DP, in addition to vitamin E, due to the higher UV absorption of DP. Although the gels with 20% loading achieved class 1 blocking, the high particle loading could impact other lens properties such as modulus, oxygen and ion permeability, and appliances were designed to achieve class 1 blocking with lower particle loading.

Figure 7:
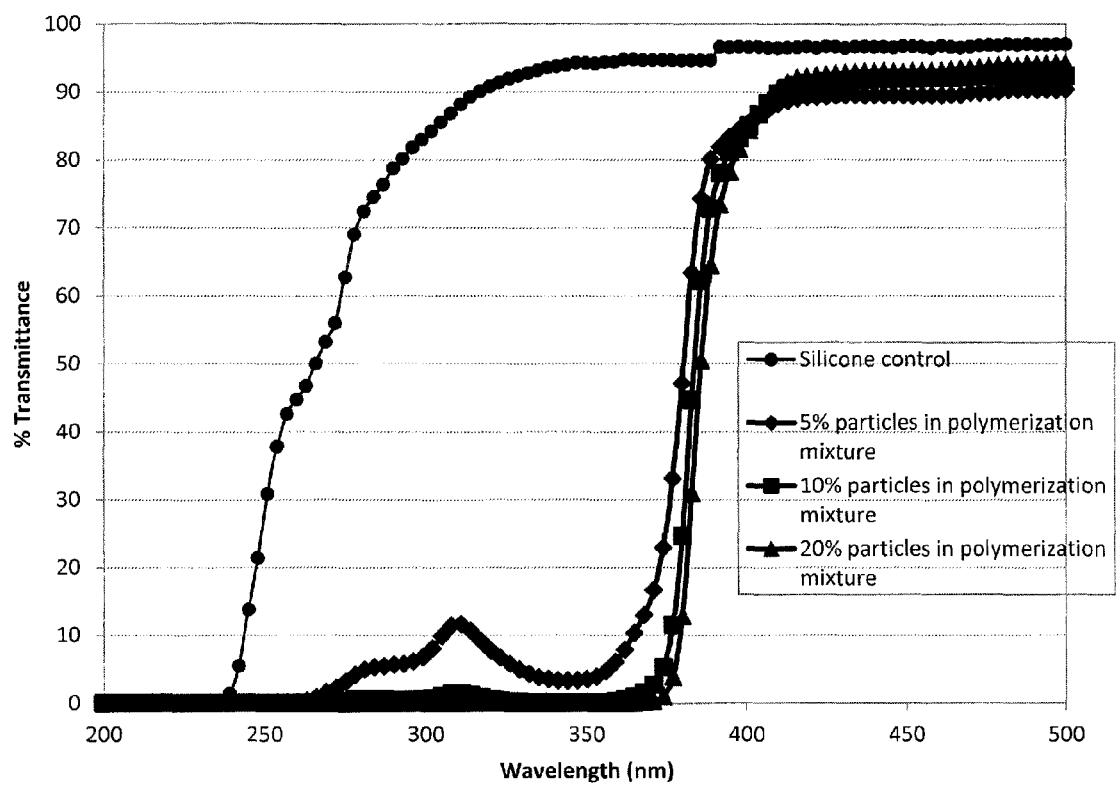
FIG. 7 shows percent transmittance spectra for appliances according to an embodiment of the invention formed from 2.6% DP containing nanoparticles dispersed in silicone polymerization mixture at different nanoparticle concentrations relative to a control appliance free of nanoparticles.

Nanoparticles with higher DP loading were dispersed in lenses by addition of the nanoparticles to the polymerization mixture. FIG. 7 shows the % transmittance of gels loaded with particles containing 2.6% DP loaded at 5, 10 and 20% w/w in the gels. Gels with 5% particles blocked UVC almost completely, but blocked only 91% UVB and do not qualify at the class 2 UV blocking classification. On increasing the loading of the particles to 10 and 20% w/w, the transmittance decreased to 0.8% and ~0%, respectively in the UVB range. Furthermore, these lenses blocked 84% and 87% in UVA ranges (315-400 nm) respectively, and 98 and 99% in the 315-380 nm range, which places the gels with 5% or 10% of the particles in the category of class 1 lenses.

Figure 8:
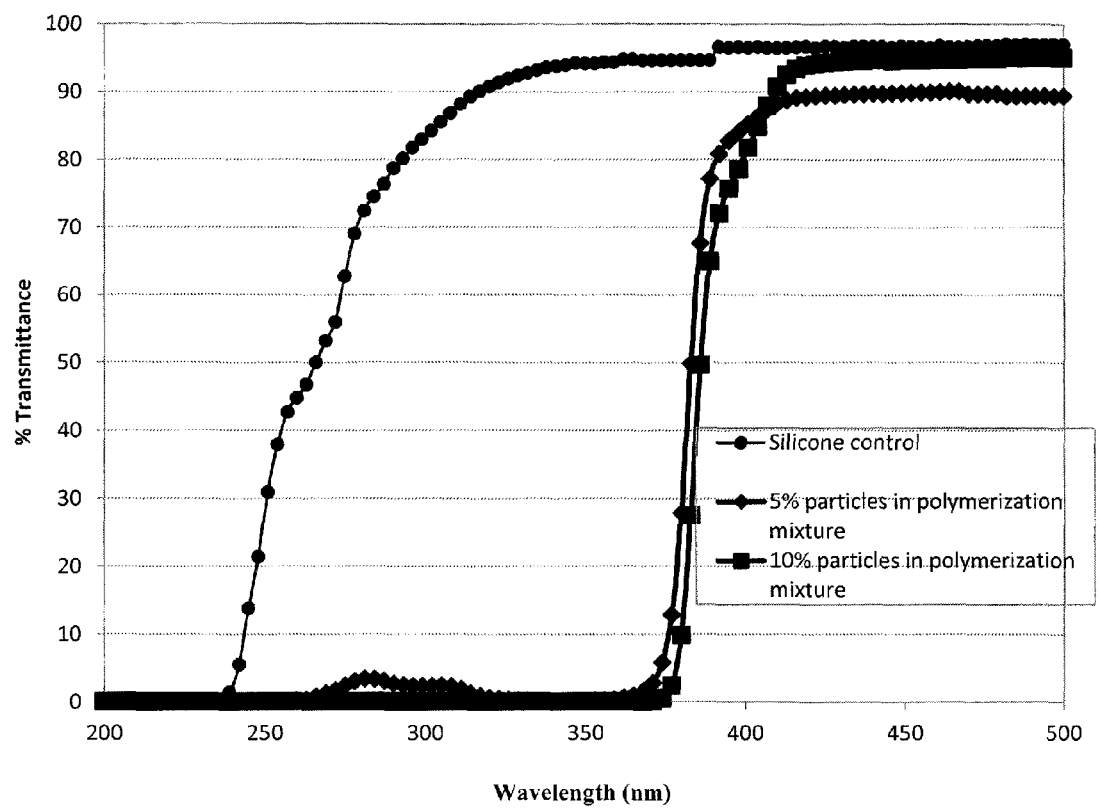
FIG. 8 shows percent transmittance spectra for appliances according to an embodiment of the invention formed from 5.9% DP containing nanoparticles dispersed in silicone polymerization mixture at different nanoparticle concentrations relative to a control appliance free of nanoparticles.
Figure 9:
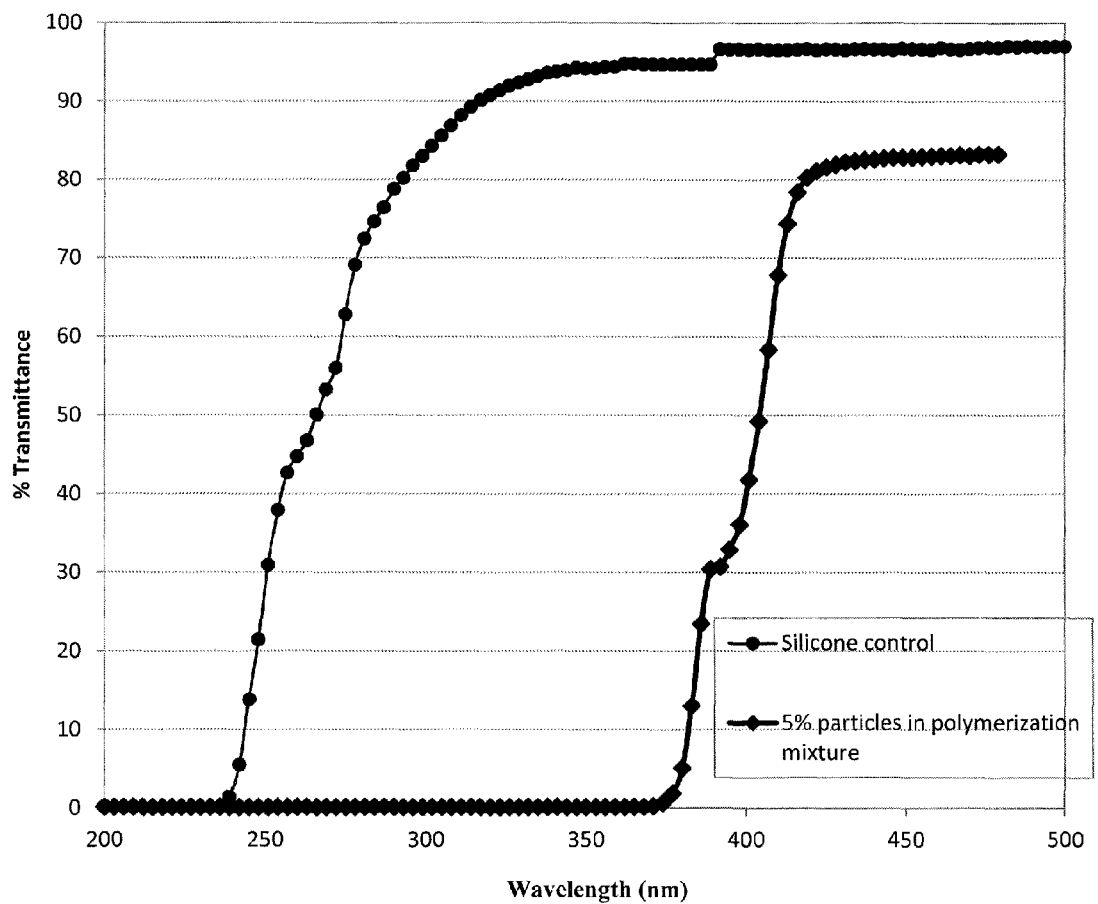
FIG. 9 shows a percent transmittance spectrum for appliances according to an embodiment of the invention formed from 9.7% DP containing nanoparticles dispersed in silicone polymerization mixture at a 5% nanoparticle concentration relative to a control appliance free of nanoparticles.
Figure 10:
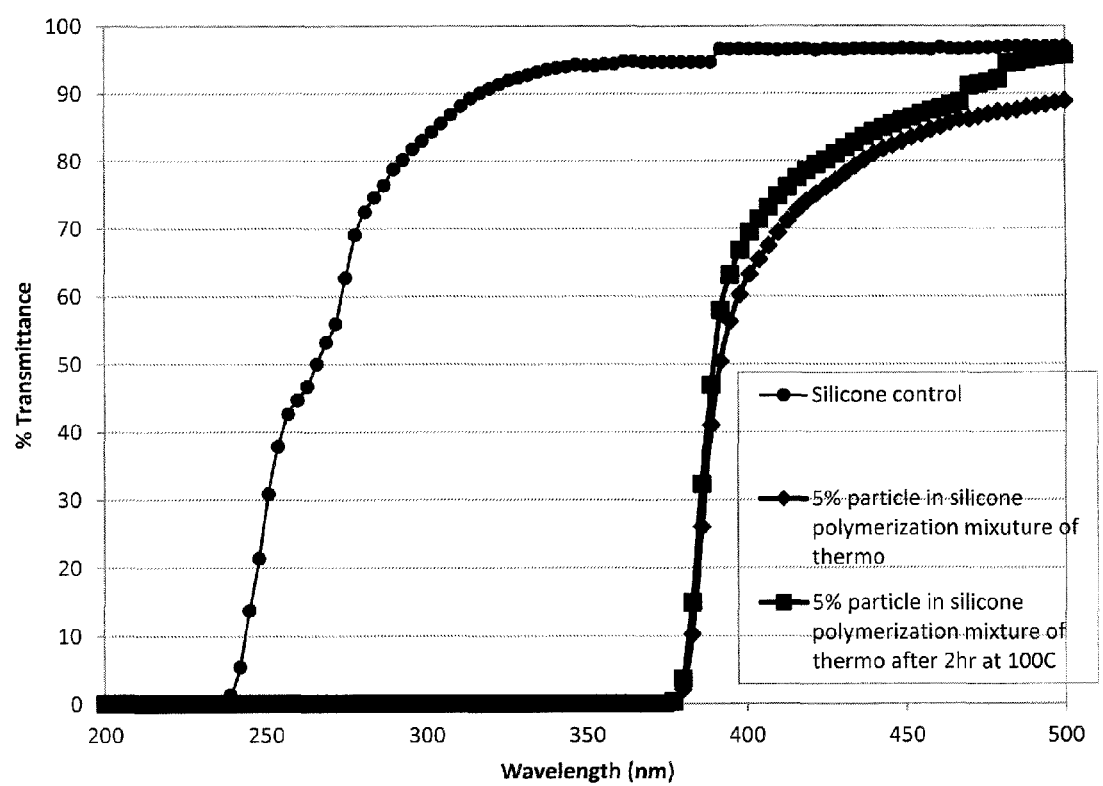
FIG. 10 shows percent transmittance spectra for appliances according to an embodiment of the invention formed from 5.9% DP containing nanoparticles dispersed in silicone polymerization mixture at a 5% concentration before and after curing thermally at 100° C. for 2 hours relative to a control appliance free of nanoparticles.

FIG. 8 and FIG. 9 show transmittance plots for gels that are loaded with nanoparticles containing 5.9% and 9.7% DP, respectively. Gels were prepared with 5 and 10% nanoparticles having 5.9% DP and with 5% nanoparticles having 9.7% DP. In all cases, the gels absorb sufficient UV radiation to be classified as class 1 UV blocking gels. Thus, increasing the amount of DP in the nanoparticles and/or the nanoparticle loading in silicone gels improved the UV blocking. However, the silicone gels formed by polymerization in the presence of UV absorbing nanoparticles become progressively softer, presumably due to the decrease in the polymerization rates due to the blocking of the UV light during polymerization. This effect was overcome by thermal polymerization to prepare gels having a 5% loading of nanoparticles with 5.9% DP using molds in an oven at 80° C. for 24 hours. These gels were prepared with a 200 μm thickness. The UV blocking from these gels was adequate for the class 1 classification (FIG. 10). The class 1 or 2 classification also depends on the thickness of the contact lenses. However, the UN absorbing nanoparticle approach can be applied to any thickness contact lens by increasing the nanoparticle loading or the fraction of DP in the nanoparticles. The 200 μm thermally polymerized gels with 5% nanoparticles having 5.9% DP particles were heated at 100° C. for 2 hours to explore the stability of the UV blocking effect after exposure to high temperatures. The gels retained class 1 classification with only a slight reduction in the UV blocking measured.

Nanoparticles Loaded by Soaking the Appliance in a Solution of Nanoparticles in Ethanol Silicone gels, prepared as described above, were soaked in 95% ethanol to remove unreacted monomers. To load the nanoparticles into the silicone gel, each gel was soaked in 3 ml of nanoparticles in ethanol. After soaking for three hours, the gels were withdrawn and submerged in 200 ml of DI water for two hours to extract ethanol from the gels. The gels were withdrawn from the water, gently wiped, and soaked in 5 ml of DI water for testing. The concentration of nanoparticles in the ethanol solution was varied from 1 to 10%. The DP loading in the nanoparticles and the nanoparticle concentration in ethanol are presented in Table 9, below.

TABLE 9

Experimental design of soaking the lenses in solution of nanoparticles in ethanol

| % UV dye per nanoparticle | Mass UV dye (mg) | Mass Vitamin E (mg) | % nanoparticles in ethanol |
| --- | --- | --- | --- |
| 10.2 | 127 | 120 | 2, 5, 10 |
| 15.8 | 210 | 120 | 1, 2, 5, 10, 20 |
| 19.6 | 280 | 150 | 1, 2, 5, 7, 10 |
| 28.1 | 450 | 150 | 1, 2, 5, 10 |

Mass of Particles Loaded

Silicone hydrogels were soaked in 10.2% DP containing nanoparticles in ethanol and the weight gain of the gels was determined after drying. The nanoparticle loading in the ethanol solutions varied from 2 to 10%. The dry weight of the gels before and after particle loading and the % increase in gel's weight are listed in Table 10, below. As shown Table 10, the increase in gel weight was proportional to the concentration of nanoparticles in ethanol. The nanoparticles diffused into the lenses during soaking because the pore size of the gels increases significantly upon swelling with ethanol.

TABLE 10

Weight change of silicone lenses after soaking in 10.2% DP nanoparticles in ethanol

| % nanoparticle in EtOH | Dry weight of silicone gel (g) | Weight change (g) after soaking | % weight change |
| --- | --- | --- | --- |
| 2 | 0.0235 | 0.0237 | 0.85 |
| 5 | 0.0232 | 0.0241 | 3.89 |
| 10 | 0.0240 | 0.0254 | 5.83 |

DP containing nanoparticles were loaded into commercial silicone hydrogel contact lenses by soaking the lenses in an ethanol solution of 2% nanoparticles having 5.9% DP. The dry mass of contact lenses before and after particle loading and the fractional weight gain of the lenses are given in Table 11, below. Commercial lenses loaded with a larger mass of nanoparticles than did laboratory prepared gels. Because contact lenses are typically autoclaved for sterilization, the UV absorbing nanoparticle loaded lenses were autoclaved. The dry weight of the lenses after autoclaving is included in Table 11. The data shows that particles that diffuse into the lenses during soaking are retained in the contact lenses after autoclaving in PBS. Soaking of the UN absorbing nanoparticle laden lenses in PBS at room temperature for extended periods did not lead to any leaching of the particles from gels or the contact lens appliances.

TABLE 11

Weight of commercial contact lenses soaked in 2% ethanol solutions of 5.9% DP nanoparticles before and after autoclaving

| Control lens | Dry weight (g) | UV blocking laden lenses | % of weight changes | After autoclaving |
| --- | --- | --- | --- | --- |
| Acuvue Oasys | 0.0219 | 0.0228 | 4.11 | 0.0225 |
| O₂ Optix | 0.0196 | 0.0202 | 3.06 | 0.0200 |
| Pure Vision | 0.0218 | 0.0226 | 3.67 | 0.0226 |
| Night & Day | 0.0223 | 0.0231 | 3.59 | 0.0230 |
| Acuvue Advance | 0.0200 | 0.0211 | 5.5 | 0.0211 |

Effect of UV Blocking Particles on Transmittance Spectra of the Lenses

Figure 11:
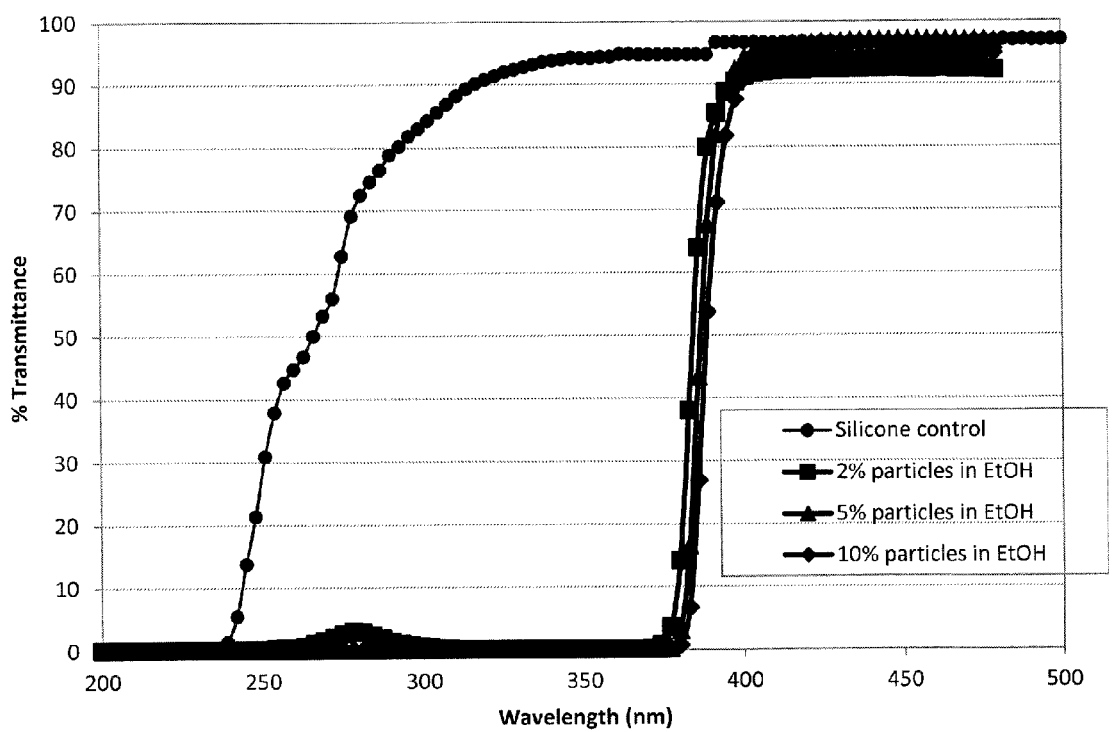
FIG. 11 shows percent transmittance spectra for appliances according to an embodiment of the invention formed by soaking the appliance in 10.2% DP containing nanoparticles solutions in various concentrations of ethanol relative to a control appliance free of nanoparticles.

The transmission spectra in the 200 nm to 480 nm range from the control silicone hydrogel and those from gels loaded with particles by soaking in an ethanol solution of UV absorbing nanoparticles are shown in FIGS. 11 to 15. Each figure corresponds to nanoparticles with a single % loading of the UV absorber and the various curves in each figure correspond to different loadings of the nanoparticles in ethanol. The average absorbance was calculated for UVA (315-380 nm and 315-400 nm), UVB and UVC ranges. FIG. 11 shows the absorption spectra from gels soaked in solutions of UV absorbing nanoparticles having 10.2% DP in ethanol. The absorbance observed for the control gel is compared with those from gels soaked in 2%, 5% and 10% nanoparticle in ethanol. The data shows significant reduction in transmittance in the UV range due to partitioning of DP containing nanoparticles into the gels during soaking in the ethanol solutions. The nanoparticle loading in the gels is proportional to loading in ethanol but the transmission spectra show only slight differences. The average absorption in the UVA, UVB and UVC ranges are listed in Tables 12-15, below, which indicate that gels soaked in the solution of nanoparticles having 5% DP absorb nearly all UVB and UVC radiation. The gels block about 84, 87 and 89% of the UVA (315-400 nm) radiation for gels of soaking in 2, 5 and 10% solutions of the nanoparticles in ethanol, and block more than 95% of the radiation at 315-380 nm, such that the appliances can be classified as class 1 UV blockers.

TABLE 12

Percentage of UVC (below 280 nm) blocked by nanoparticle laden silicone gels

| % UV dye in nanoparticle | % nanoparticle in EtOH | | | | |
|---|---|---|---|---|---|
| | 1 | 2 | 5 | 7 | 10 | 20 |
| 10.2 | | 99.5 | 99.9 | | 99.9 | |
| 15.8 | 99.7 | 99.9 | 99.9 | | 99.9 | 99.9 |
| 19.6 | 99.43 | 99.9 | 99.9 | 99.9 | 99.9 | |
| 28.1 | 99.89 | 99.9 | 99.9 | | 99.9 | |

TABLE 13

Percentage of UVB (280-315 nm) blocked by nanoparticle laden silicone gels

| % UV dye in nanoparticle | % nanoparticle in EtOH | | | | |
|---|---|---|---|---|---|
| | 1 | 2 | 5 | 7 | 10 | 20 |
| 10.2 | | 99.0 | 99.9 | | 99.9 | |
| 15.8 | 99.4 | 99.9 | 99.9 | | 99.9 | 99.9 |
| 19.6 | 99.7 | 99.9 | 99.9 | 99.9 | 99.9 | |
| 28.1 | 99.9 | 99.9 | 99.9 | | 99.9 | |

TABLE 14

Percentage of UVA (315-380 nm) blocked by nanoparticle laden silicone gels

| % UV dye in nanoparticle | % nanoparticle in EtOH | | | | |
|---|---|---|---|---|---|
| | 1 | 2 | 5 | 7 | 10 | 20 |
| 10.2 | | 99.36 | 99.82 | | 99.89 | |
| 15.8 | 99.45 | 99.76 | 99.89 | | 99.9 | 99.9 |
| 19.6 | 99.27 | 99.77 | 99.9 | 99.9 | 99.9 | |
| 28.1 | 99.81 | 99.88 | 99.9 | | 99.9 | |

TABLE 15

Percentage of UVA (315-400 nm) blocked by nanoparticle laden silicone gels

| % UV dye in nanoparticle | % nanoparticle in EtOH | | | | |
|---|---|---|---|---|---|
| | 1 | 2 | 5 | 7 | 10 | 20 |
| 10.2 | | 84.38 | 87.05 | | 89.38 | |
| 15.8 | 85.25 | 86.21 | 90.31 | | 92.95 | 94.36 |
| 19.6 | 83.63 | 86.17 | 92.10 | 92.39 | 93.86 | |
| 28.1 | 86.73 | 88.48 | 93.54 | | 99.61 | |

Figure 12:
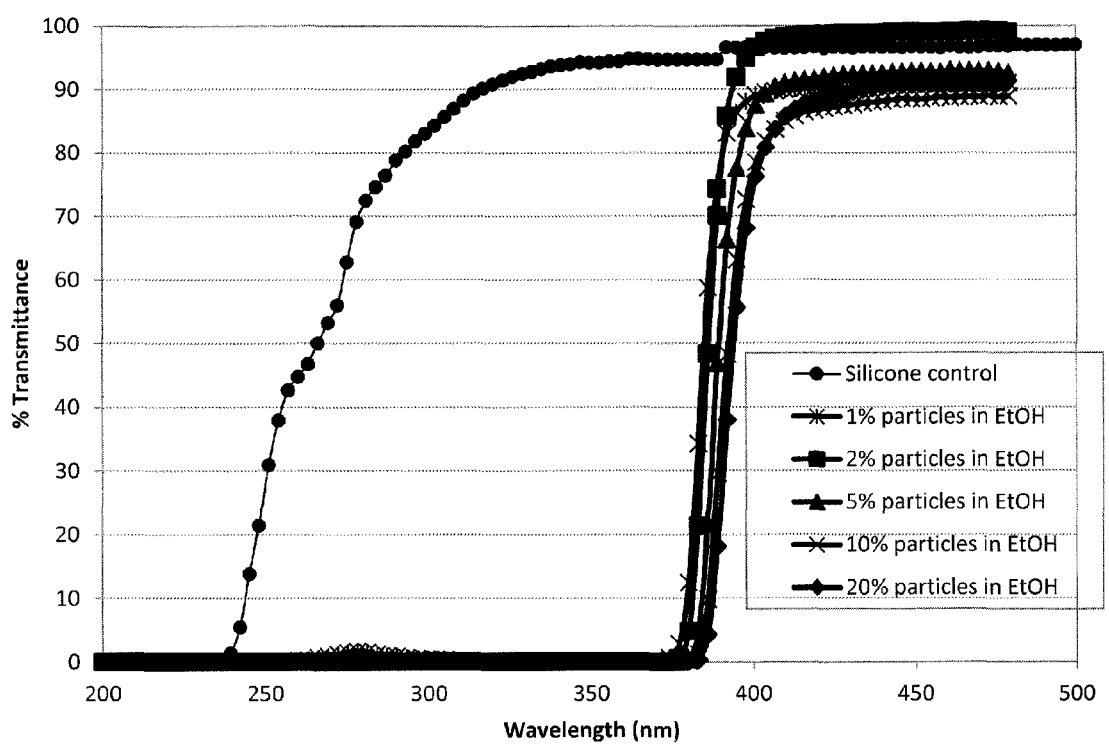
FIG. 12 shows percent transmittance spectra for appliances according to an embodiment of the invention formed by soaking the appliance in 15.8% DP containing nanoparticles solutions in various concentrations of ethanol relative to a control appliance free of nanoparticles.
Figure 13:
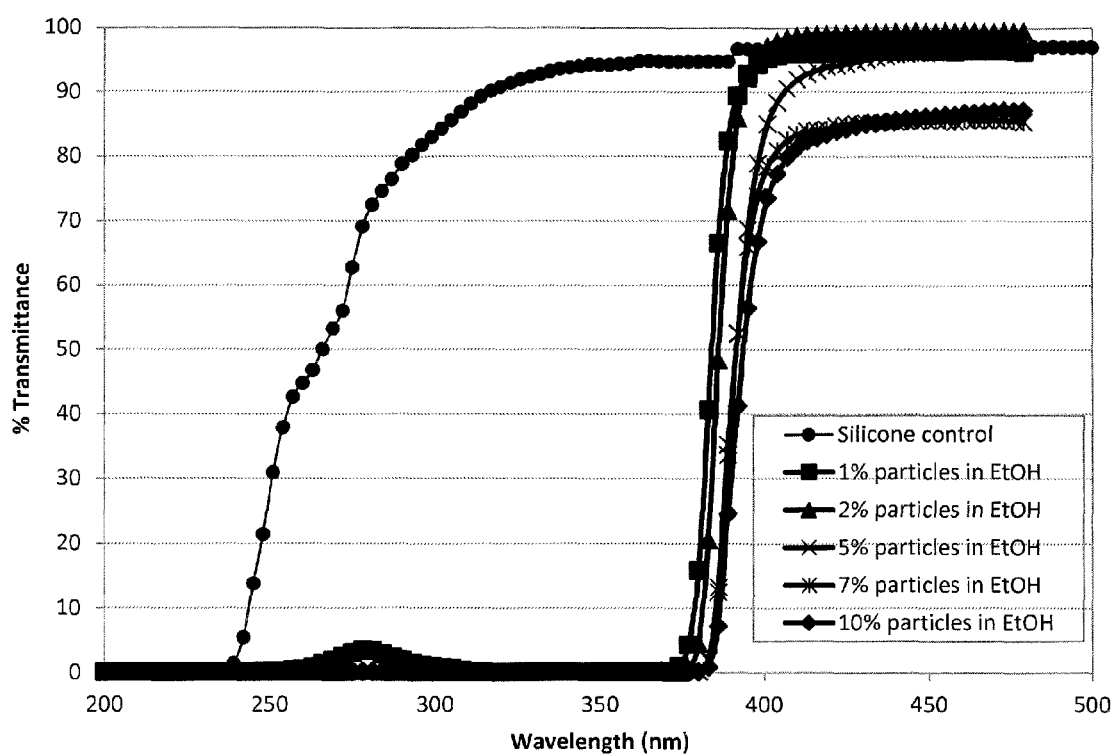
FIG. 13 shows percent transmittance spectra for appliances according to an embodiment of the invention formed by soaking the appliance in 19.6% DP containing nanoparticles solutions in various concentrations of ethanol relative to a control appliance free of nanoparticles.

To achieve class 1 UV blocking levels with lower nanoparticle loadings that improve UV blocking in lenses beyond the class 1 requirements, particles with higher DP content were loaded into gels by soaking in ethanol solutions of nanoparticles. FIG. 12 shows the transmittance of gels soaked in ethanol solutions of nanoparticles containing 15.8% DP. Gels were soaked in ethanol solutions having different nanoparticle concentrations (1, 2, 5, 10, and 20%) to prepare gels with different particle loadings. The curves in FIG. 12, and the average absorbance values in Tables 12-15, above, show that all gels almost completely blocked UVC, UVB and UVA (315-380 nm) radiation. The gels soaked in 1 or 2% solutions block less than 90% UVA (315-400 nm) but the gels soaked in 5, 10 and 20% solutions blocked 90.31, 92.95 and 94.36% UVA (315-400 nm) radiation, respectively, and are superior to class 1 UV blockers.

Figure 14:
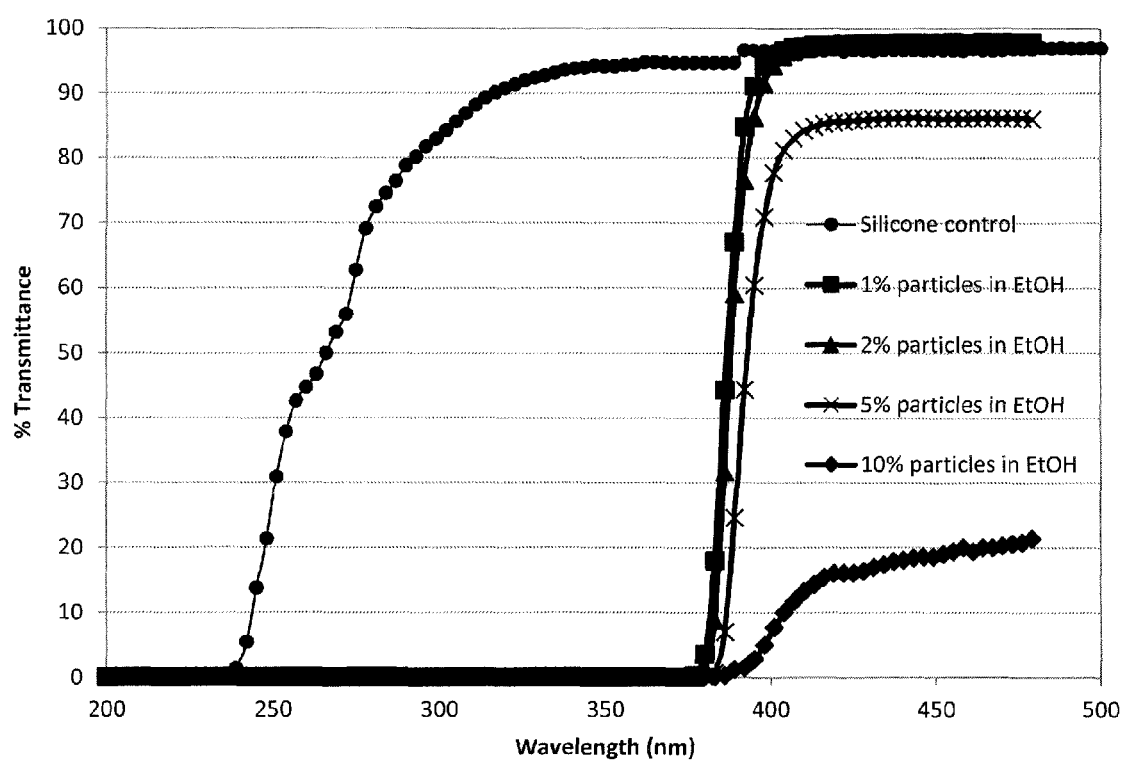
FIG. 14 shows percent transmittance spectra for appliances according to an embodiment of the invention formed by soaking the appliance in 28.1% DP containing nanoparticles solutions in various concentrations of ethanol relative to a control appliance free of nanoparticles.

UV absorbing nanoparticle loaded gels clearly display reduced UV transmittance. To achieve class 1 blocking with minimum nanoparticle loading, gels were loaded with nanoparticles containing 19.6% DP which show the transmittance profiles of FIG. 13 for several different loadings from ethanol solutions having different concentrations of nanoparticles. The gels loaded with the 19.6% DP particles almost completely block UVC, UVB and UVA (315-380 nm). Gels soaked in 7 and 10% solutions display reduced transmittance in the visible range, due to a partial loss in transparency. Gels soaked in 5% solutions block 92.10% UVA (315-400 nm), and can be considered as UV blockers superior to class 1 blockers. In FIG. 14, transmittance spectra are shown for gels soaked in ethanol solutions of nanoparticles containing 28.1% DP. Lenses soaked in 10% solutions are partially opaque. Gels soaked in 5% solutions are class 1 blockers that block some visible light. Gels soaked in 1 and 2% solutions are completely visible light transparent and block sufficient UV radiation to be class 1 classified.

Characterization of Contact Lenses Containing UV Blocking Nanoparticles

Figure 16:
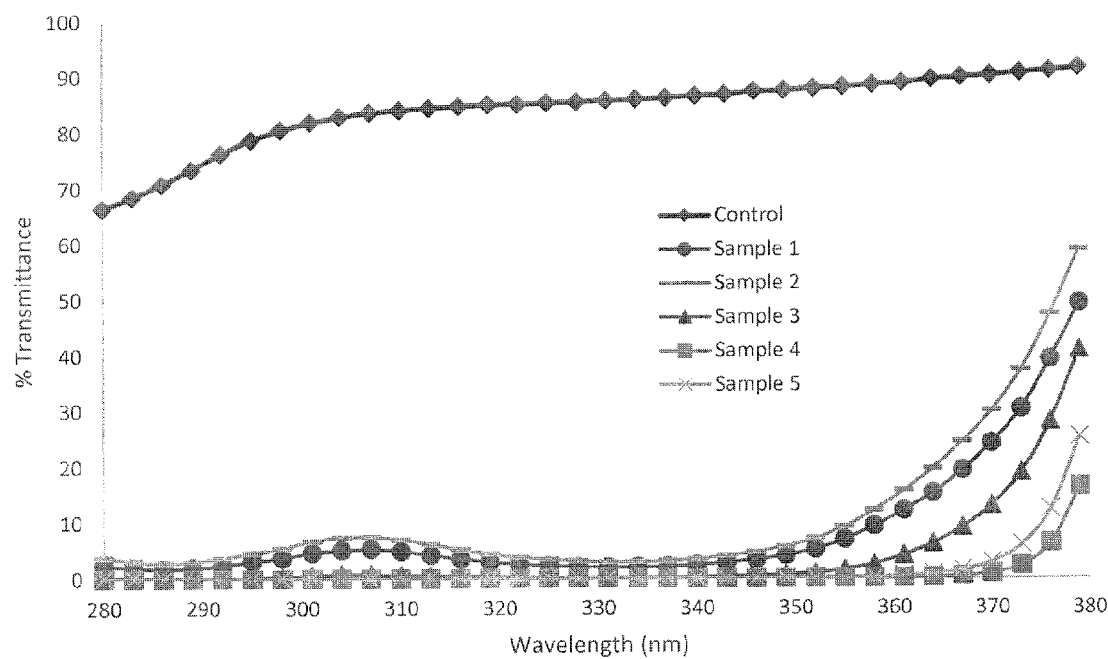
FIG. 16 shows composite UV transmittance spectra for Night & Day contact lenses loaded with the UV absorbing nanoparticles of Table 4 for 5 minutes, according to an embodiment of the invention.

The transmittance of the nanoparticle-laden lenses was measured using a UV-Vis spectrophotometer. The lenses were hydrated and mounted on the outer surface of a quartz cuvette. The cuvette was placed in the spectrophotometer and the transmittance was measured from 280 nm wavelength to 380 nm. Transmittance data is used to calculate average blocking of the UVA and UVB range. For the UVA range, average blocking is determined for the range 316-380 nm and the average blocking for UVB is determined for the range 280-316 nm. The lenses were visually clear and the UV blocking from the lenses is summarized in Table 16, below. A Class 1 lens is required to block 99% of UVB and 90% of UVA light. The lenses that achieved the required blocking are marked as Class 1 lenses in Table 17, below. Spectra are shown in FIG. 16 for a few representative cases.

TABLE 16

UV transmittance of nanoparticle loaded lenses

| | Sample # | | | | |
|---|---|---|---|---|---|
| | 1 | 2 | 3 | 4 | 5 |
| Particles loaded for 5 minutes | | | | | |
| UVA Transmittance (%) | 3.6 | 5.3 | 0.5 | 0.1 | 0.1 |
| UVB Transmittance (%) | 10.4 | 13.2 | 5.2 | 1.0 | 1.8 |
| Class I | | | Yes | Yes | Yes |
| Particles loaded for 24 hours | | | | | |
| UVA Transmittance (%) | 0.4 | 5.6 | 1.9 | 1.0 | 0.5 |
| UVB Transmittance (%) | 4.5 | 15.6 | 11.0 | 6.8 | 4.7 |
| Class I | Yes | | | Yes | Yes |

TABLE 17

Concentrations of DP and BHPEA in particle loaded lenses calculated from absorbance spectrum and release into ethanol

| | Sample # | 1 | 2 | 3 | 4 | 5 |
|---|---|---|---|---|---|---|
| | Particles loaded for 5 minutes | | | | | |
| Lens Fit | BHPEA (mg/ml) | 2.4 | 1.9 | 3.5 | 7.1 | 5.3 |
| | DP (mg/ml) | 1.2 | 1.1 | 1.8 | 6.1 | 4.0 |
| Release Fit | BHPEA (mg/ml) | 2.7 | 1.3 | 2.8 | 4.0 | 3.6 |
| | DP (mg/ml) | 1.0 | 0.6 | 0.8 | 2.0 | 1.6 |
| | Particles loaded for 24 hours | | | | | |
| Lens Fit | BHPEA (mg/ml) | 3.7 | 1.8 | 2.3 | 3.1 | 3.7 |
| | DP (mg/ml) | 2.1 | 0.8 | 1.1 | 1.5 | 2.0 |
| Release Fit | BHPEA (mg/ml) | 2.6 | 1.5 | 3.0 | | |
| | DP (mg/ml) | 0.7 | 0.3 | 0.8 | | |

Transmittance spectra was converted to the absorbance spectra $A=-\log_{in}(T/100)$ and the spectra was then fitted to Equation II by a least square fit to determine the concentration of DP and BHPEA in the lens. To obtain the molar absorptivity of DP in the lens, a contact lens was soaked in a solution of DP in water at a concentration of 0.02 mg/mL. The absorption spectra of the lens were measured and the lens soaked in ethanol to extract loaded DP. By measuring the concentration of DP in the ethanol, the mass of DP extracted was calculated, and used to calculate the concentration of DP in the lens. By using the measured absorbance and the calculated concentration, the molar absorptivity of DP in the lens was calculated using the Beer Lambert law with a path length of 80 microns. The molar absorptivity of BHPEA in the lens was measured in the same manner. By using the molar absorptivities and fitting the absorbance from the particle loaded lenses to Equation II, above, the concentrations of BHPEA and DP in the lens were determined. For validation, particle loaded lenses were soaked in ethanol, and the concentration of DP and BHPEA was determined in ethanol by measuring the absorbance spectra. The calculated concentration in ethanol was used to calculate the concentration in the lens. The concentrations of DP and BHPEA in various particle loaded lenses using both methods are given in Table 5, above.

Release of the UV Blocking Molecules in PBS from the Particle Loaded Lenses

Release studies were conducted on the lenses loaded with particles by soaking the lenses in 3 ml of PBS for 24 hours. The concentrations of the UV blockers in PBS were determined using UV-Vis spectrophotometry. The release medium was tested for presence of particles by DLS. Unreacted DP and BHPEA in the lens can be calculated from concentration data from the PBS solution if the partition coefficient between PBS and the lens is known.

$$k = \frac{c_{lens}}{c_{sol}} \quad \text{Equation III}$$

Figure 17:
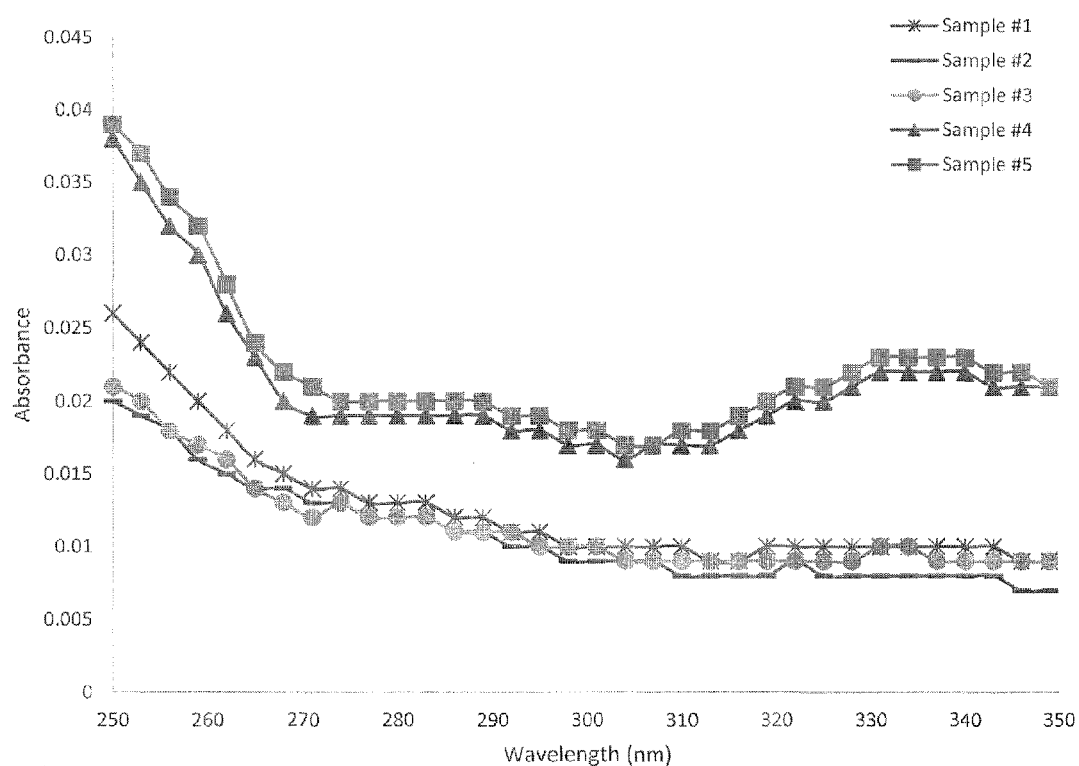
FIG. 17 shows UV spectra of UV absorbing compounds released from Night & Day contact lenses of the compositions given in Table 6 into PBS solution, according to an embodiment of the invention.

Partition coefficients for DP and BHPEA were determined by soaking a lens with known concentration of BHPEA or DP in a PBS solution. By determining the concentration in the solution before and after soaking the lens, the mass of BHPEA or DP incorporated into the lens was determined. The concentration of BHPEA or DP in the lens was determined by weighing the wetted lens and assuming a density of the lens to be 1 g/ml. With concentrations in the lens and the solution known, k can be determined. If no particles are releasing from the lenses, all release into solution will be from unreacted components and the partition coefficients can be used to calculate concentrations of unreacted components inside the lens. The spectra of the release medium are shown in FIG. 17 for a few representative cases. The calculated values of the unreacted concentrations of BHPEA and DP are listed in Table 18, below.

Effect of Autoclaving

Figure 15:
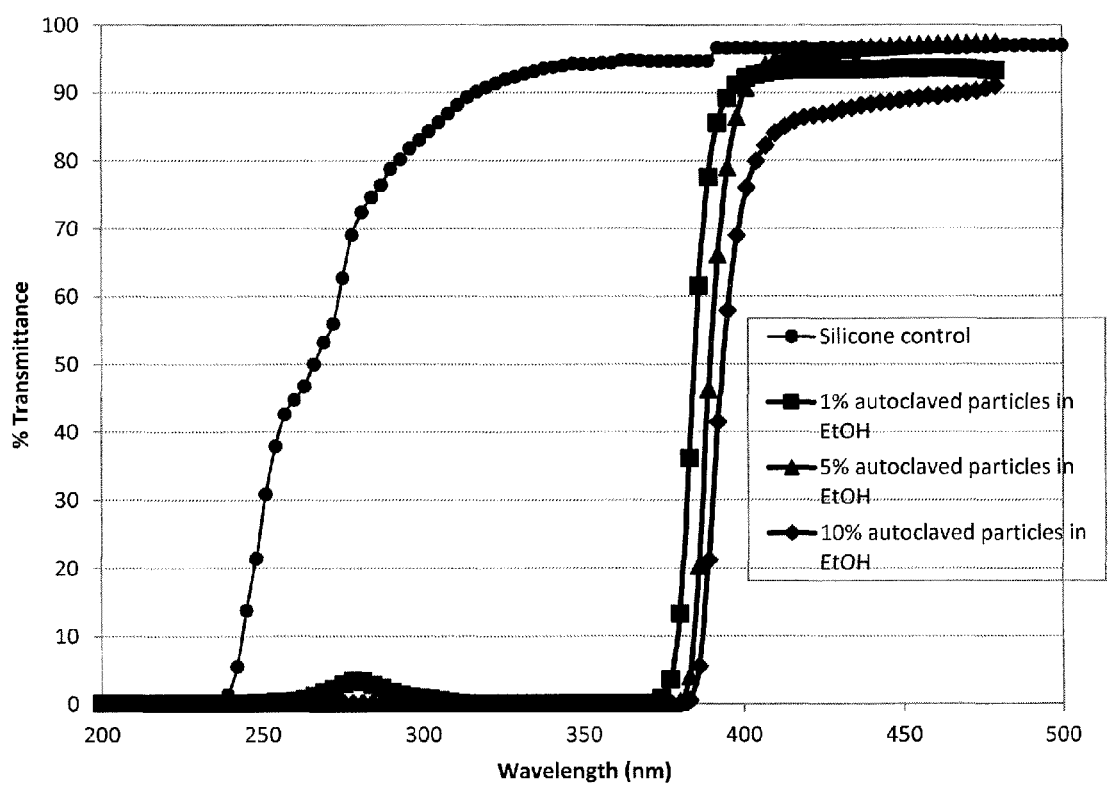
FIG. 15 shows percent transmittance spectra for autoclaved appliances according to an embodiment of the invention formed by soaking the appliance in 15.8% DP containing nanoparticles solutions in various concentrations of ethanol relative to a control appliance free of nanoparticles.
Figure 18:
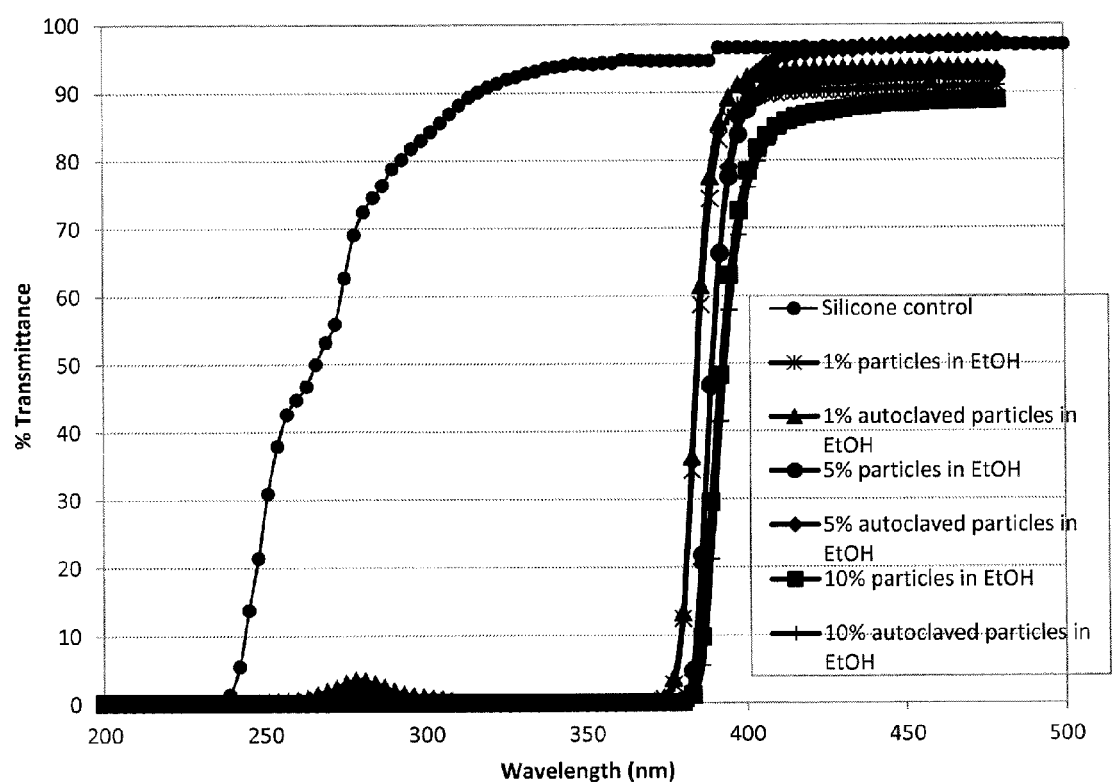
FIG. 18 shows percent transmittance spectra for appliances according to an embodiment of the invention formed by soaking the appliance in 15.8% DP containing nanoparticles solutions in various concentrations of ethanol relative to a control appliance free of nanoparticles where nanoparticles were as prepared or after autoclaving.

Nanoparticles with 15.8% DP were autoclaved at 121° C. for 1 hour and then loaded into the silicone hydrogel by soaking the gel in ethanol solution of the nanoparticles. The concentration of nanoparticles in ethanol was 1, 5 and 10% (FIG. 15). The transmission spectra from the lenses loaded with autoclaved nanoparticles is equivalent to those loaded with non-autoclaved nanoparticles of the same 15.8% DP loading and the same nanoparticle concentration (FIG. 18). The spectra in FIG. 18 are relatively unaffected by autoclaving indicating that DP loaded highly crosslinked nanoparticles maintain their UV absorption efficiency upon autoclaving.

Effect of Autoclaving on UV Blocking

Figure 19:
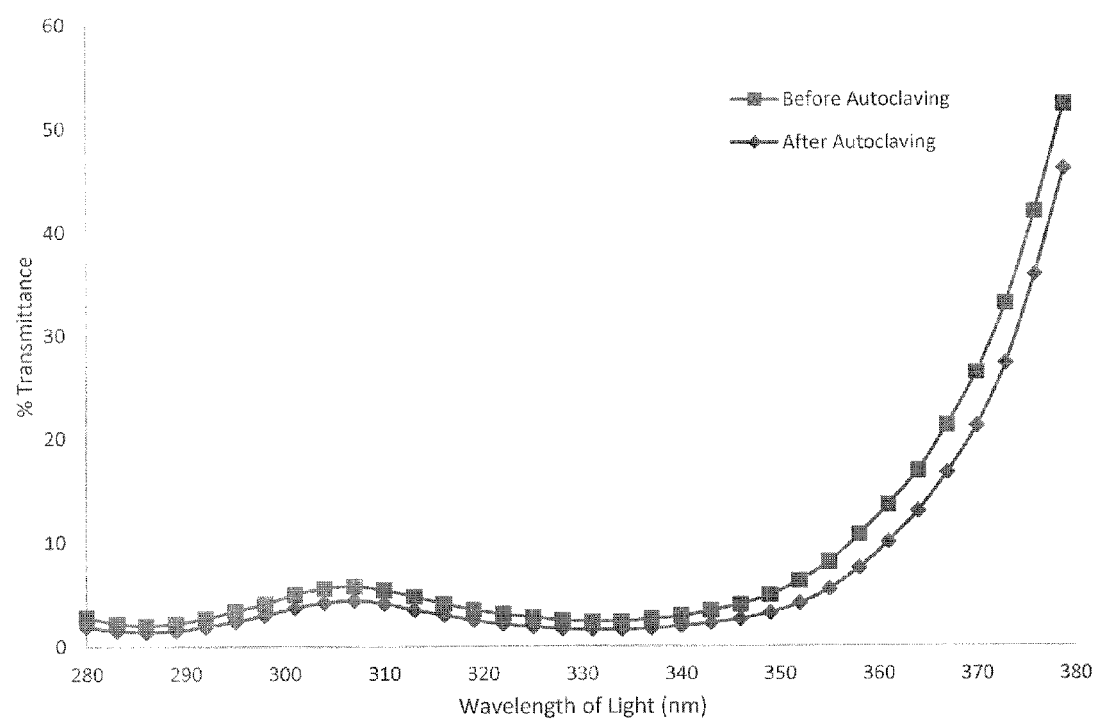
FIG. 19 shows a UV transmittance spectrum for a Night & Day contact lens loaded with UV absorbing nanoparticles before and after autoclaving, according to an embodiment of the invention.

Contact lenses are sterilized by autoclaving, so it is necessary to determine the effect of autoclaving on the UV blocking efficiency of the particle loaded lenses. Lenses containing the UV blocking particles were submerged in boiling water for one hour. Testing before and after autoclaving showed little change in the transmittance of UV light through the lens, as shown in FIG. 19.

TABLE 18

Concentration of unreacted components in lenses

Particles loaded for 5 minutes

| | Sample # | | | | |
|---|---|---|---|---|---|
| | 1 | 2 | 3 | 4 | 5 |
| Total BHPEA (mg/ml) | 2.66 | 1.28 | 2.77 | 4.04 | 3.57 |
| Unreacted BHPEA (mg/ml) | 0.04 | 0.04 | 0.04 | 0.08 | 0.09 |
| Reacted BHPEA (mg/ml) | 2.62 | 1.24 | 2.73 | 3.96 | 3.48 |
| Ratio reacted/unreacted BHPEA in lens | 59.72 | 31.09 | 68.99 | 49.16 | 40.52 |
| Total DP (mg/ml) | 1.03 | 0.60 | 0.84 | 2.01 | 1.59 |
| Unreacted DP (mg/ml) | 0.18 | 0.12 | 0.17 | 0.43 | 0.44 |
| Reacted DP (mg/ml) | 0.86 | 0.47 | 0.67 | 1.58 | 1.15 |
| Ratio reacted/unreacted DBM in lens | 4.86 | 3.80 | 3.86 | 3.71 | 2.63 |

Particles loaded for 24 hours

| | Sample # | | |
|---|---|---|---|
| | 1 | 2 | 3 |
| Total BHPEA (mg/ml) | 2.57 | 1.49 | 2.97 |
| Unreacted BHPEA (mg/ml) | 0.07 | 0.06 | 0.08 |
| Reacted BHPEA (mg/ml) | 2.50 | 1.43 | 2.90 |
| Ratio reacted/unreacted BHPEA in lens | 36.54 | 23.55 | 36.87 |
| Total DBM (mg/ml) | 0.72 | 0.26 | 0.75 |
| Unreacted DBM (mg/ml) | 0.06 | 0.03 | 0.09 |
| Reacted DBM (mg/ml) | 0.66 | 0.22 | 0.66 |
| Ratio reacted/unreacted DBM in lens | 11.09 | 6.77 | 7.25 |

Figure 20:
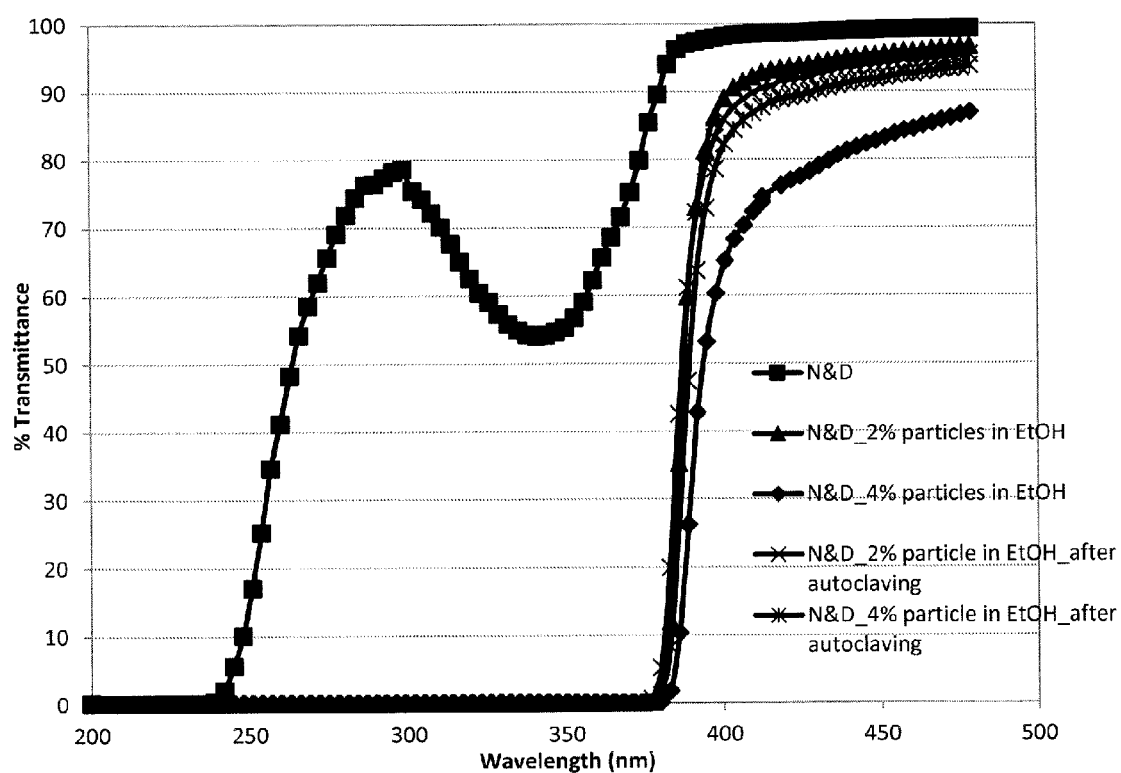
FIG. 20 shows percent transmittance spectra for appliances according to an embodiment of the invention formed by soaking Night and Day® contact lenses in 19.6% DP containing nanoparticles solutions in various concentrations of ethanol relative to a control appliance free of nanoparticles where lenses were as solution treated or after autoclaving the solution treated lenses.
Figure 21:
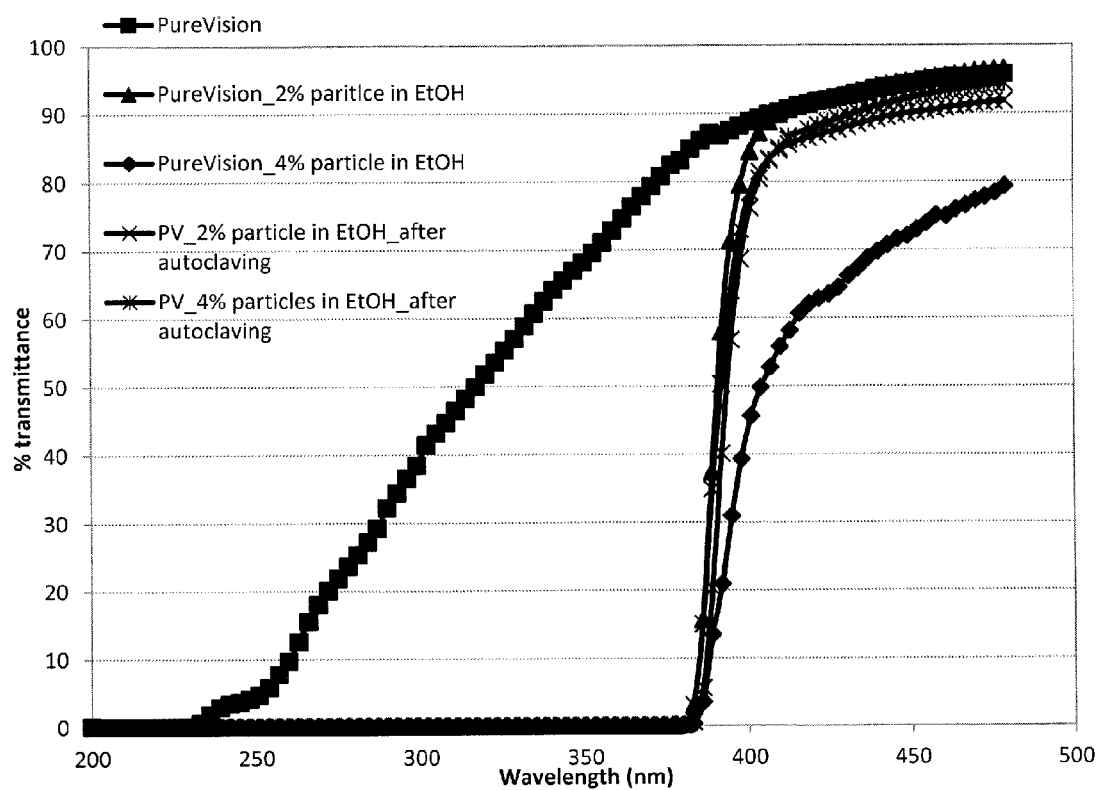
FIG. 21 shows percent transmittance spectra for appliances according to an embodiment of the invention formed by soaking PureVision® contact lenses in 19.6% DP containing nanoparticles solutions in various concentrations of ethanol relative to a control appliance free of nanoparticles where lenses were as solution treated or after autoclaving the solution treated lenses.

UV Absorption in Commercial Contact Lenses Loaded with DP Containing Nanoparticles Commercial contact lenses (Night & Day and Pure Vision) were soaked in 3 ml of ethanol solution having 2 and 4% nanoparticles with 19.6% DP. The procedures for loading the nanoparticles in the commercial lenses were as those described above for loading nanoparticles in cured silicone hydrogels. The nanoparticle loaded lenses were autoclaved at 121° C. for one hour. The transmission spectra from the nanoparticle loaded contact lenses, before and after autoclaving, are shown in FIG. 20 and FIG. 21. The % UV blocking is shown in Table 19, below. In all cases, the nanoparticle loaded contact lenses almost completely blocked UVA and UVB radiation. The contact lenses soaked in 2 and 4% solutions blocked 99.85 and 99.9% (Night and Day) and 99.9 and 99.9% (Pure Vision), respectively and can be classified as class 1 UV blockers. The % absorbance at 315-400 nm was 88.57 and 93.82% (Night and Day) and 91.57 and 96.63% (Pure Vision) for lenses soaked in 2 and 4% solutions, respectively.

TABLE 19

UV blocking for 19.6% DP nanoparticle loaded Nigh&Day and PureVision lenses

|  |  | UVC | UVB | UVA (315-380 nm) | UVA (315-400 nm) |
|---|---|---|---|---|---|
| Night & Day | Control | 82.3 | 25.2 | 36.92 | 29.58 |
|  | 2% particle in EtOH | 99.9 | 99.9 | 99.85 | 88.57 |
|  | After autoclaving | 99.9 | 99.9 | 99.75 | 88.00 |
|  | 4% particle in EtOH | 99.9 | 99.9 | 99.9 | 93.82 |
|  | After autoclaving | 99.9 | 99.9 | 99.9 | 90.34 |
| PureVision | Control | 94.4 | 62.7 | 32.54 | 28.34 |
|  | 2% particle in EtOH | 99.9 | 99.9 | 99.9 | 91.57 |
|  | After autoclaving | 99.9 | 99.9 | 99.9 | 92.37 |
|  | 4% particle in EtOH | 99.9 | 99.9 | 99.9 | 96.63 |
|  | After autoclaving | 99.9 | 99.9 | 99.9 | 94.08 |

All patents, patent applications, provisional applications, and publications referred to or cited herein, supra or infra, are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

We claim:

1. A UV absorbing nanoparticle, comprising at least one UV absorbing compound dispersed in a cross-linked gel, wherein the cross-link density is sufficiently high to inhibit diffusion of the UV absorbing compound within the cross-linked gel, wherein the UV absorbing compounds are selected from reacted and unreacted 1,3-diphenyl-1,3-propanedione (DP) and reacted and unreacted 2-(4-Benzoyl-3-hydroxyphenoxy)ethyl acrylate (BHPEA), and wherein the nanoparticles are less than 350 nm in diameter.

2. The UV absorbing nanoparticle of claim 1, wherein the mean particle size less than or equal to 10 nm in diameter.

3. The UV absorbing nanoparticle of claim 1, wherein the UV absorbing compound absorbs light in the UVA, UVB and UVC regions of the electromagnetic spectrum.

4. The UV absorbing nanoparticle of claim 1, wherein the UV absorbing compounds absorb light in the UVA and UVB regions of the electromagnetic spectrum.

5. The UV absorbing nanoparticle of claim 1, wherein the cross-linked gel is the polymerization product of an alkene comprising monomer mixture wherein the average monomer has a plurality of alkene units.

6. The UV absorbing nanoparticle of claim 5, wherein the alkene comprising monomer is propoxylated glyceryl triacrylate (PGT).

7. A method for the preparation of UV absorbing nanoparticles according to claim 1, comprising:

providing an alkene comprising monomer mixture wherein the average monomer has a plurality of alkene units;

providing a free radical initiator;

providing a UV absorbing compound, wherein the UV absorbing compounds are selected from reacted and unreacted 1,3-diphenyl-1,3-propanedione (DP) and reacted and unreacted 2-(4-Benzoyl-3-hydroxyphenoxy)ethyl acrylate (BHPEA);

providing a diluent;

combining the alkene comprising monomer mixture, the free radical initiator; the UV absorbing compound, and the diluent with an emulsion system comprising a surfactant and an aqueous solution to form an emulsion; and polymerizing the alkene comprising monomer mixture to form an emulsion comprising a multiplicity of UV absorbing nanoparticles within non-aqueous microemulsion droplets of the emulsion.

8. The method of claim 7, wherein the diluent is vitamin E.

9. The method of claim 7, further comprising separating the UV absorbing nanoparticles from the emulsion by centrifugation.

10. A method for the preparation of UV absorbing nanoparticles according to claim 1, comprising:

providing at least one alkene comprising monomer wherein the average monomer has a plurality of alkene units;

providing a free radical initiator;

providing at least one UV absorbing compound, wherein the UV absorbing compounds are selected from reacted and unreacted 1,3-diphenyl-1,3-propanedione (DP) and reacted and unreacted 2-(4-Benzoyl-3-hydroxyphenoxy)ethyl acrylate (BHPEA);

providing at least one chain transfer agent;

combining the alkene comprising monomer mixture, the free radical initiator; the UV absorbing compound, and the chain transfer agent;

polymerizing the alkene comprising monomer mixture for a period of time such that gelation occurs locally to form UV absorbing nanoparticles;

adding at least one solvent; and performing dialysis to separate the monomer, the UV absorbing compounds, the chain transfer agent, and the free radical initiator that have not been fixed in the UV absorbing nanoparticles from the UV absorbing nanoparticles.

11. The method of claim 10, wherein the alkene comprising monomer is propoxylated glyceryl triacrylate (PGT).

12. The method of claim 10, wherein the chain transfer agent is isooctyl 3-mercaptopropionate (CTA).

13. The method of claim 10, wherein the free radical initiator is benzoyl peroxide.

14. The method of claim 10, wherein the at least one solvent is a mixture of ethanol and acetone.

15. A method for the preparation of UV absorbing nanoparticles according to claim 1, comprising:

providing an alkene comprising monomer mixture wherein the average monomer has a plurality of alkene units;

providing a free radical initiator;

providing a UV absorbing compound, wherein the UV absorbing compounds are selected from reacted and unreacted 1,3-diphenyl-1,3-propanedione (DP) and reacted and unreacted 2-(4-Benzoyl-3-hydroxyphenoxy)ethyl acrylate (BHPEA);

providing a diluent;

combining the alkene comprising monomer mixture, the free radical initiator; the UV absorbing compound, and the diluent with an organic solvent; and polymerizing the alkene comprising monomer mixture to form a multiplicity of UV absorbing nanoparticles.

16. A UV absorbing nanoparticle, comprising at least one UV absorbing compound dispersed in a cross-linked gel, wherein the cross-link density is sufficiently high to inhibit diffusion of the UV absorbing compound within the cross-linked gel, and wherein the nanoparticles are less than 350 nm in diameter, wherein the cross-linked gel is the polymerization product of an alkene comprising monomer mixture wherein the average monomer has a plurality of alkene units, and wherein the alkene comprising monomer is propoxylated glyceryl triacrylate (PGT).

17. The UV absorbing nanoparticle of claim 16, wherein the mean particle size less than or equal to 10 nm in diameter.

18. The UV absorbing nanoparticle of claim 16, wherein the UV absorbing compound absorbs light in the UVA, UVB and UVC regions of the electromagnetic spectrum.

19. The UV absorbing nanoparticle of claim 16, wherein the UV absorbing compounds absorb light in the UVA and UVB regions of the electromagnetic spectrum.

20. The UV absorbing nanoparticle of claim 16, wherein the UV absorbing compounds are selected from reacted and unreacted 1,3-diphenyl-1,3-propanedione (DP) and reacted and unreacted 2-(4-Benzoyl-3-hydroxyphenoxy)ethyl acrylate (BHPEA).

21. A method for the preparation of UV absorbing nanoparticles according to claim 16, comprising:

providing an alkene comprising monomer mixture wherein the average monomer has a plurality of alkene units, wherein the alkene comprising monomer comprises propoxylated glyceryl triacrylate (PGT);

providing a free radical initiator;

providing a UV absorbing compound;

providing a diluent;

combining the alkene comprising monomer mixture, the free radical initiator; the UV absorbing compound, and the diluent with an emulsion system comprising a surfactant and an aqueous solution to form an emulsion; and polymerizing the alkene comprising monomer mixture to form an emulsion comprising a multiplicity of UV absorbing nanoparticles within non-aqueous microemulsion droplets of the emulsion.

22. The method of claim 21, wherein the diluent is vitamin E.

23. The method of claim 21, further comprising separating the UV absorbing nanoparticles from the emulsion by centrifugation.

24. A method for the preparation of UV absorbing nanoparticles according to claim 16, comprising:

providing at least one alkene comprising monomer wherein the average monomer has a plurality of alkene units, wherein the alkene comprising monomer is propoxylated glyceryl triacrylate (PGT);

providing a free radical initiator;

providing at least one UV absorbing compound;

providing at least one chain transfer agent;

combining the alkene comprising monomer mixture, the free radical initiator; the UV absorbing compound, and the chain transfer agent;

polymerizing the alkene comprising monomer mixture for a period of time such that gelation occurs locally to form UV absorbing nanoparticles;

adding at least one solvent; and performing dialysis to separate the monomer, the UV absorbing compounds, the chain transfer agent, and the free radical initiator that have not been fixed in the UV absorbing nanoparticles from the UV absorbing nanoparticles.

25. The method of claim 24, wherein the alkene comprising monomer is propoxylated glyceryl triacrylate (PGT).

26. The method of claim 24, wherein the chain transfer agent is isooctyl 3-mercaptopropionate (CTA).

27. The method of claim 24, wherein the UV absorbing compounds are selected from reacted and unreacted 1,3-diphenyl-1,3-propanedione (DP) and reacted and unreacted 2-(4-Benzoyl-3-hydroxyphenoxy)ethyl acrylate (BHPEA).

28. The method of claim 24, wherein the free radical initiator is benzoyl peroxide.

29. The method of claim 24, wherein the at least one solvent is a mixture of ethanol and acetone.

30. A method for the preparation of UV absorbing nanoparticles according to claim 16, comprising:

providing an alkene comprising monomer mixture wherein the average monomer has a plurality of alkene units, wherein the alkene is monomer comprises propoxylated glyceryl triacrylate (PGT);

providing a free radical initiator;

providing a UV absorbing compound;

providing a diluent;

combining the alkene comprising monomer mixture, the free radical initiator; the UV absorbing compound, and the diluent with an organic solvent; and polymerizing the alkene comprising monomer mixture to form a multiplicity of UV absorbing nanoparticles.

31. The method of claim 30, wherein the UV absorbing compounds are selected from reacted and unreacted 1,3-diphenyl-1,3-propanedione (DP) and reacted and unreacted 2-(4-Benzoyl-3-hydroxyphenoxy)ethyl acrylate (BHPEA).

* * * * *

UNITED STATES PATENT AND TRADEMARK OFFICE
CERTIFICATE OF CORRECTION

PATENT NO. : 9,594,188 B2  
APPLICATION NO. : 14/296899  
DATED : March 14, 2017  
INVENTOR(S) : Anuj Chauhan et al.

Page 1 of 1

It is certified that error appears in the above-identified patent and that said Letters Patent is hereby corrected as shown below:

In the Specification

Column 8,  
Line 39, "variety or" should read --variety of--.

Column 9,  
Line 34, "can bi" should read --can be--.

Column 11,  
Line 34, "% chain transfer" should read --40% chain transfer--.

Column 12,  
Line 16, "$A(\lambda) = (\varepsilon_{DBM}c_{DMB} + \varepsilon_{BHPEA}c_{BHPEA})l$" should read --$A(\lambda) = (\varepsilon_{DBM}c_{DBM} + \varepsilon_{BHPEA}c_{BHPEA})l$--.

Column 17,  
Line 27, "the UN" should read --the UV--.

Column 21,  
Line 19, "$A = -\log_{in}(T/100)$" should read --$A = -\log_{10}(T/100)$--.

Column 23,  
Line 16, "Nigh&Day" should read --Night&Day--.

Signed and Sealed this  
Nineteenth Day of September, 2017

Joseph Matal  
*Performing the Functions and Duties of the*  
*Under Secretary of Commerce for Intellectual Property and*  
*Director of the United States Patent and Trademark Office*